United States Patent
Yamamoto et al.

(10) Patent No.: US 7,260,720 B2
(45) Date of Patent: Aug. 21, 2007

(54) DEVICE AUTHENTICATION SYSTEM AND METHOD FOR DETERMINING WHETHER A PLURALITY OF DEVICES BELONG TO A GROUP

(75) Inventors: Masaya Yamamoto, Hirakata (JP); Kouji Miura, Matsubara (JP); Tohru Nakahara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 765 days.

(21) Appl. No.: 10/271,563

(22) Filed: Oct. 17, 2002

(65) Prior Publication Data
US 2003/0084291 A1    May 1, 2003

(30) Foreign Application Priority Data
Oct. 19, 2001    (JP)    ............................ 2001-321656

(51) Int. Cl.
*H04L 9/00*    (2006.01)
*G06F 21/00*    (2006.01)
(52) U.S. Cl. .................. 713/169; 380/283; 726/28; 726/3; 713/168
(58) Field of Classification Search ............... 713/169; 380/283
See application file for complete search history.

(56) References Cited

U.S. PATENT DOCUMENTS

| | | | |
|---|---|---|---|
| 5,146,497 A * | 9/1992 | Bright | 380/273 |
| 5,748,796 A | 5/1998 | Pennino et al. | |
| 5,905,860 A * | 5/1999 | Olsen et al. | 726/27 |
| 6,064,297 A | 5/2000 | Odinak et al. | |
| 6,327,652 B1 * | 12/2001 | England et al. | 713/2 |
| 6,453,305 B1 * | 9/2002 | Glassman et al. | 705/59 |
| 6,816,596 B1 * | 11/2004 | Peinado et al. | 380/277 |
| 2002/0010681 A1 * | 1/2002 | Hillegass et al. | 705/59 |
| 2002/0037736 A1 | 3/2002 | Kawaguchi et al. | |
| 2002/0046181 A1 * | 4/2002 | Story et al. | 705/59 |
| 2002/0136405 A1 * | 9/2002 | Hori | 380/203 |
| 2002/0152261 A1 * | 10/2002 | Arkin et al. | 709/202 |
| 2003/0014655 A1 * | 1/2003 | England et al. | 713/200 |
| 2003/0084306 A1 * | 5/2003 | Abburi et al. | 713/188 |
| 2004/0010467 A1 * | 1/2004 | Hori et al. | 705/50 |

FOREIGN PATENT DOCUMENTS

| | | |
|---|---|---|
| JP | 10-023028 | 1/1998 |
| JP | 2002-111679 | 4/2002 |

OTHER PUBLICATIONS

Specification of the Bluetooth System, Specification vol. 1, Version 1.0B, Dec. 1, 1999, pp. 2-42, 149-177, 18-191, 246-257, 429-438.*
Bluetooth Security Architecture, Version 1.0, Jul. 15, 1999, pp. 2-33.*

* cited by examiner

*Primary Examiner*—David Y. Jung
*Assistant Examiner*—Thomas Szymanski
(74) *Attorney, Agent, or Firm*—Wenderoth, Lind & Ponack, L.L.P.

(57) ABSTRACT

Transmitting data sent from A first device includes random information, which is encrypted by using common information, and a checksum, and the transmitting data is sent to a second device. The second device receives the transmitting data, and sends back answering data that includes an answer message, which is encrypted by using the random information, and checksum, to the first device.

31 Claims, 13 Drawing Sheets

Example of displaying common information

Displaying common information
The common information set for this device is: "zeppetstore"

Example of common information setting screen

Setting the common information
Please input the newly set common information and the password for the setting for this device.

Common information
Password

OK

DEVICE AUTHENTICATION SYSTEM AND METHOD FOR DETERMINING WHETHER A PLURALITY OF DEVICES BELONG TO A GROUP

TECHNICAL FIELD

The present invention relates to a device authentication system that is necessary when each device authenticates other devices within a same network, and the present invention especially relates to a device authentication system used among a plurality of terminals.

BACKGROUND ART

In recent years, digital content such as music, movies and games can be easily obtained through distribution via the Internet, digital broadcasting or package media. When copying or moving these digital content and their rights between a plurality of terminals, it is usually not allowed to move them limitlessly, although copying or moving the content only within a certain range is permitted.

It is generally considered that copying and moving is permitted only among a plurality of terminals owned by a single user. In order to realize such a restriction that allows copying and moving only within a certain range, it is necessary that a group of terminals be formed within which copying and moving among each other is allowed.

Until now, it has been assumed that this kind of group determination is performed by a server (a group determination terminal). The following is a brief explanation of a group determination processing performed by a server.

The conventional group determination system includes a server, which determines a group, and a plurality of terminals that are controlled by and connected with the server so that communication is possible via network. The server holds group lists of terminals that belong to each group. A group list means, for example, information that associates a group identifier with terminal identifiers.

In a group determination system structured as described above, group determination is carried out as follows. First, in order for a controlled terminal to acquire a group list of devices that the terminal itself belongs to, the terminal sends a terminal list requesting data to a server. In this terminal list requesting data, information such as the terminal's own terminal identifier and group identifier are included. According to the information included in the terminal list requesting data, the server sends to the requesting terminal a group list that corresponds to the information. By obtaining group information of the group that a controlling terminal belongs to through these procedures, a controlled terminal is able to realize group determination.

For example, in a conventional member identification method for identifying groups, a host terminal broadcasts packets of data that include the name of all the members as well as a network address unique to the host terminal. Each member terminal, then, analyzes the received packets and identifies the information retrieved from a packet that has its name in it, and sends a packet that includes the names of each member and the network addresses unique to each member terminal as data to the host terminal. The host terminal, then, analyzes the received packets, and if the host terminal finds the name of a member that belongs to the same group, the host terminal obtains the information included in the packet, corresponds the member name and a terminal address, and saves the corresponding data (for an example, see the Japanese Laid-Open Patent Application No. H10-23028 as reference).

First, to explain problems that this conventional group determination method has, it is considered that in this method, a parent-child relationship occurs between a server terminal (group determination terminal) and terminals that are controlled by the server, and thus the server terminal and the controlled terminals must have different functions.

Next, the situation when a conventional determination method is applied to home electric appliances generally used by end users is considered. In order to apply a conventional determination method, a user must understand the parent-child relationships of home appliances he/she owns, and must consider how to set parent-child relationships between the appliances when he/she purchases any home electric appliance. This is because a server terminal is indispensable in the group determination and it is assumed that server terminals and controlled terminals are different in their functions and prices.

Basically, for terminals such as home electric appliances that are added from time to time and various usages can also be assumed, the relationship between terminals should be equal. However, there is no conventional method known for creating a group when all the terminals are in equal relationships.

Now, in consideration of the foregoing problems, the device authentication system according to the present invention enables terminals to determine other terminals that belong to a same group, when terminals are in equal relationships with each other.

Also, in the device authentication system according to the present invention, an object is for a terminal to be able to obtain a list of devices that belong to a same group in a secure manner, before the terminal carries out processing such as authentication or content transmission that gives a heavy load to the terminal. Furthermore, in the device authentication system according to the present invention, another object is that by using the aforementioned group list, a terminal is able to determine to which device it will send transmitting data, and realizes efficient utilization of a communication channel by not communicating with terminals that are not allowed to obtain certain content.

Another object of the present invention is to provide a device authentication system that is capable of contributing to the future popularization of network distribution of charged content.

SUMMARY OF INVENTION

In order to achieve the above objects, the present invention provides a device authentication system comprising at least a first device and a second device for determining whether or not the first device and the second device belong to a same group. The first device includes: a first common information memory unit operable to memorize common information; a transmitting data generating unit operable to generate transmitting data that includes key information; a first encryption unit operable to encrypt the generated transmitting data by using the common information; a first transmission unit operable to send the encrypted transmitting data generated by the first encryption unit to the second device; a first decryption unit operable to decrypt, by using the key information, encrypted answering data sent from the second device; and an authentication unit operable to judge whether or not the decrypted answering data has a predetermined rule, and when the decrypted answering data has a predetermined rule, to determine that the first device and the second device belong to a same group. The second device includes: a second common information memory unit operable to memorize the common information; a second decryption unit operable to decrypt, by using the common information, the encrypted transmitting data sent from the first device; a judging unit operable to judge whether or not the decrypted transmitting data has a predetermined rule; an answering data generating unit operable to determine that, when the transmitting data is judged to have a predetermined rule, the first device and the second device belong to a same group, and to generate answering data indicating that the first device and the second device belong to a same group; a second encryption unit operable to encrypt the generated answering data by using key information included in the transmitting data decrypted by the second decryption unit; and a second transmission unit operable to send the encrypted answering data generated by the second encryption unit to the first device.

Also, in order to achieve the above objects, the present invention provides a device authentication system in which the transmitting data generating unit generates a random number, and generates transmitting data that includes the generated random number as the key information. Furthermore, the present invention provides a device authentication system in which the first device further includes a checksum generating unit operable to generate a first checksum of the transmitting data, the first transmission unit sends the first checksum, together with the encrypted transmitting data, to the second device, and the judging unit judges whether or not the transmitting data has the predetermined rule by judging whether or not a second checksum of the decrypted transmitting data is equal to the first checksum sent from the first device.

Additionally, in order to achieve the above objects, the present invention provides a device authentication system comprising a plurality of the second devices, wherein the first transmission unit broadcasts the transmitting data to a plurality of the second devices.

Moreover, in order to achieve the above objects, the present invention provides a device authentication system in which the transmitting data generating unit generates the transmitting data to include search information that specifies a target of searching, the second device further includes a search information judging unit operable to judge whether or not the second device holds a target indicated by the search information that is included in the decrypted transmitting data, and the answering data generating unit generates the answering data to include a result of judgment made by the search information judging unit.

Likewise, in order to achieve the above objects, the present invention provides a device authentication system in which the transmitting data generating unit makes a content ID that specifies digital content to be included in the transmitting data as the search information, and the answering data generating unit makes a license ID that specifies a license to be included in the answering data, when the second device holds the license, which is right information that allows utilization of the digital content indicated by the content ID that is included in the transmitting data.

Furthermore, the present invention can be realized not only as the above-mentioned device authentication system, but also as a device authentication method that has the steps included in the device authentication system, as well as a communication device that realizes the constituent units on a device.

Needless to say, the present invention can also be realized as a program that realizes the device authentication method on a computer etc., or the program can be distributed via recording media such as CD-ROMs or transmission media such as a communication network.

BRIEF DESCRIPTION OF DRAWINGS

These and other objects, advantages and features of the present invention will become apparent from the following description thereof when taken in conjunction with the accompanying drawings that illustrate specific embodiments of the invention.

DETAILED DESCRIPTION OF THE INVENTION

The following is an explanation of the best mode for carrying out the present invention, with reference to the attached drawings for understanding of the present invention. However, the following embodiments are only some examples of realizing the present invention and are not to limit the technical field of the invention. Now, the best mode for carrying out the present invention is explained with reference to the drawings.

Prior to a detailed explanation of the present invention, this is the definition of the "group" in the present invention. If there are terminals that allow processing such as copying or moving contents or the rights of the contents between each other, it is logically possible to "group" the terminals. The unit of these "grouped" terminals is called the "Authorized Domain", and is hereinafter referred to as a "group" for simplicity.

The First Embodiment

Figure 1:
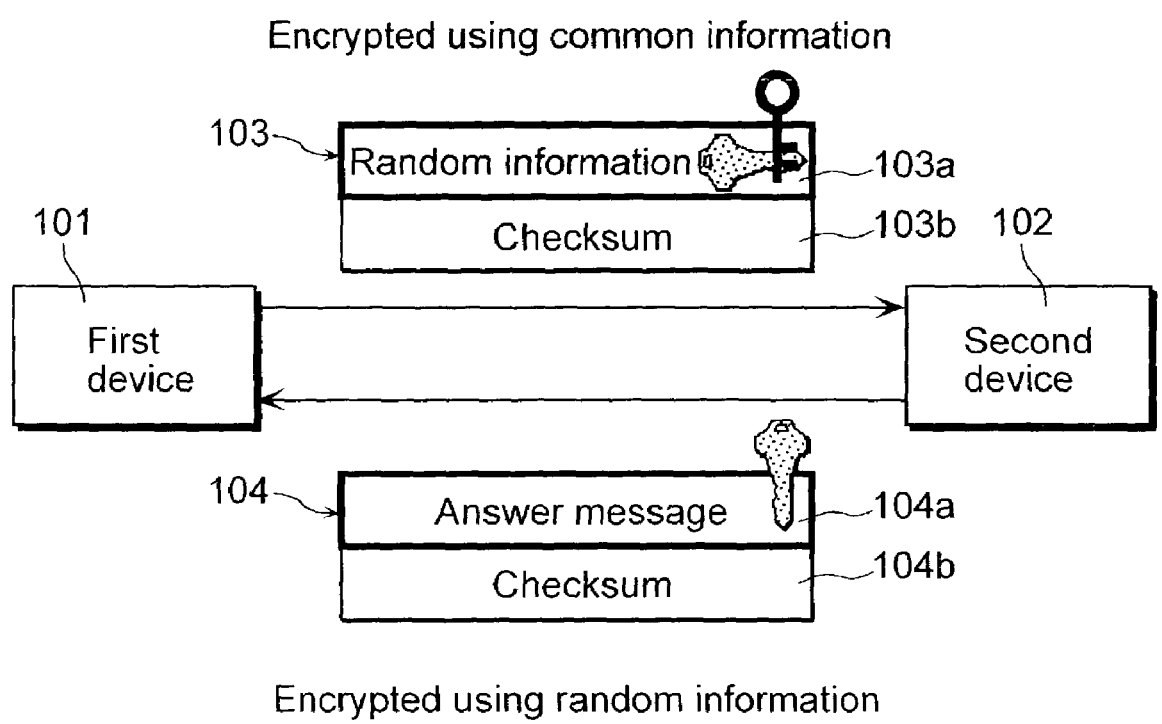
FIG. 1 is an illustration explaining a device authentication system according to a first embodiment.

FIG. 1 is an illustration that explains a device authentication system according to the first embodiment of the present invention. In FIG. 1, the first device 101 and the second device 102 are connected so that data transmission through a transmission channel, either wired or wirelessly, is possible. Here, the first device 101 represents a device that determines whether other terminals belong to the same group as itself, and the second device 102 represents a device that responds to the device which inquires whether it belongs to the same group as the inquiring device. In this first embodiment, an explanation is presented using the two terminals, the first device 101 and the second device 102, but device authentication is possible through the same method for all terminals that are within a broadcast reachable area.

The first device 101, for example, can be a device used by the end user, such as a PC, a cellular phone, or a set-top box. This first device 101 is the device that carries out grouping and creates group lists. In order to carry out grouping, the first device 101 creates transmitting data 103, encrypts the transmitting data 103 and sends the encrypted transmitting data 103 out to the second device 102.

The second device 102 is, similar to the first device 101, a terminal such as a PC, a cellular phone or a set-top box, which is within the broadcast reachable area. The second device 102 receives the transmitting data 103 sent from the first device 101, creates and encrypts answering data 104, and sends the answering data 104 back to the first device 101.

Transmitting data 103 includes random information 103a and checksum 103b. This random information 103a is encrypted by common information such as passwords that are random byte strings generated by the first device 101. The checksum 103b is the information, where data such as the random information 103a is divided, and the data in each block are converted into numeric values and then added up before sending out. In this first embodiment, the checksum 103b is not encrypted before sending, but it is also possible to encrypt the checksum 103b by common information etc. before sending out.

Answering data 104 is the data given in response to the information sent out from the first device 101, and the answering data 104 includes an answer message 104a and checksum 104b. In the answer message 104a, such information as to certify that the device is within the same group is included, and the answer message 104a is encrypted by using the random information 103a that has been received. The checksum 104b is, similar to the checksum 103b, the information, where data such as the answer message 104a is divided before sending, and the data in each block are converted into numeric values and added up. In the present embodiment, the information is not encrypted before sending back.

Figure 2:
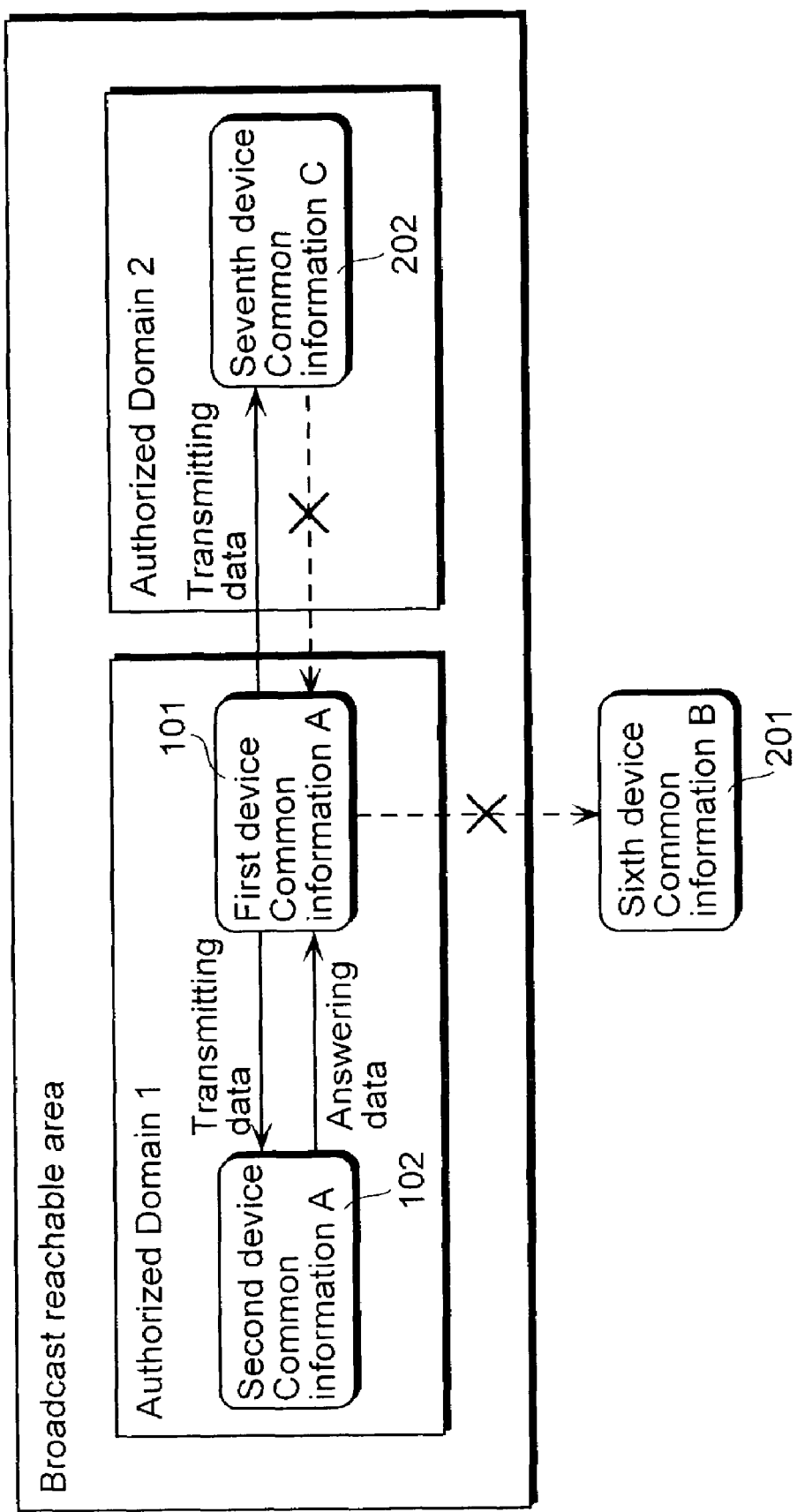
FIG. 2 is a diagram showing relationships of a plurality of devices and groups according to the first embodiment of the present invention.

Now, with reference to FIG. 2, the procedure of how the first device 101 determines whether or not other devices belong to the same group as itself is explained. In the first embodiment, the difference of whether a device belongs to the same group or not depends on whether or not the device holds common information A. This means, in order to carry out the group determination processing using the present invention's method, it is presupposed that all the devices that belong to the same group hold the common information A.

FIG. 2 shows an example of the relationship of a plurality of devices and groups according to the first embodiment. Here, the first device 101, the second device 102, the sixth device 201 and the seventh device 202 are included in this device authentication system. In the first embodiment, the first device 101 represents a device that carries out filtering of other devices that belong to the same group as itself, and via broadcast, the first device 101 determines whether or not other devices belong to the same group as itself. In FIG. 2, the first device 101 and the second device 102 belong to the same group, Authorized Domain 1, and the seventh device 202 belongs to another group, Authorized Domain 2.

The first device 101 is a terminal such as a PC, and broadcasts transmitting data that is encrypted by using the common information A to the second device 102 and the seventh device 202, both of which are within the broadcast reachable area and allow data transmission. Here, the range that allows transmission includes, for example, a home network used within each house.

The second device 102 holds the common information A, and is able to decrypt the transmitting data that has been encrypted by using this common information A. Disregarding any transmission error, the second device 102 is able to send back correct answering data to the first device 101. When the first device 101 receives the answering data, the first device 101 determines that the second device 102 belongs to the same group as itself by carrying out certain prescribed processing.

Since the seventh device 202 holds common information C, which is different from common information A, when the seventh device 202 receives transmitting data that has been encrypted by using common information A, the result of prescribed processing carried out at the checksum determination unit of the seventh device 202 will be "not equal", and thus does not send back any answering data. Even if the result of the checksum determination carried out at the seventh device 202 was "equal" by coincidence, the checksum determination carried out at the first device 101 will be "unequal" and thus the seventh device 202 will not be added to the list as a device which belongs to the same group. Meanwhile, the sixth device 201, which is outside the broadcast reachable area, will not be determined to be in the same group since transmitting data will not reach the device.

Using the aforementioned determination method, the first device 101 is able to create a list of devices that belong to the same group as itself without sending the common information A. It is guaranteed that all the devices that are included in the group list at least hold common information A, and thus is guaranteed that they belong to the same group.

Now, the detailed structures of the first device 101 and the second device 102 will be explained, respectively.

Figure 3:
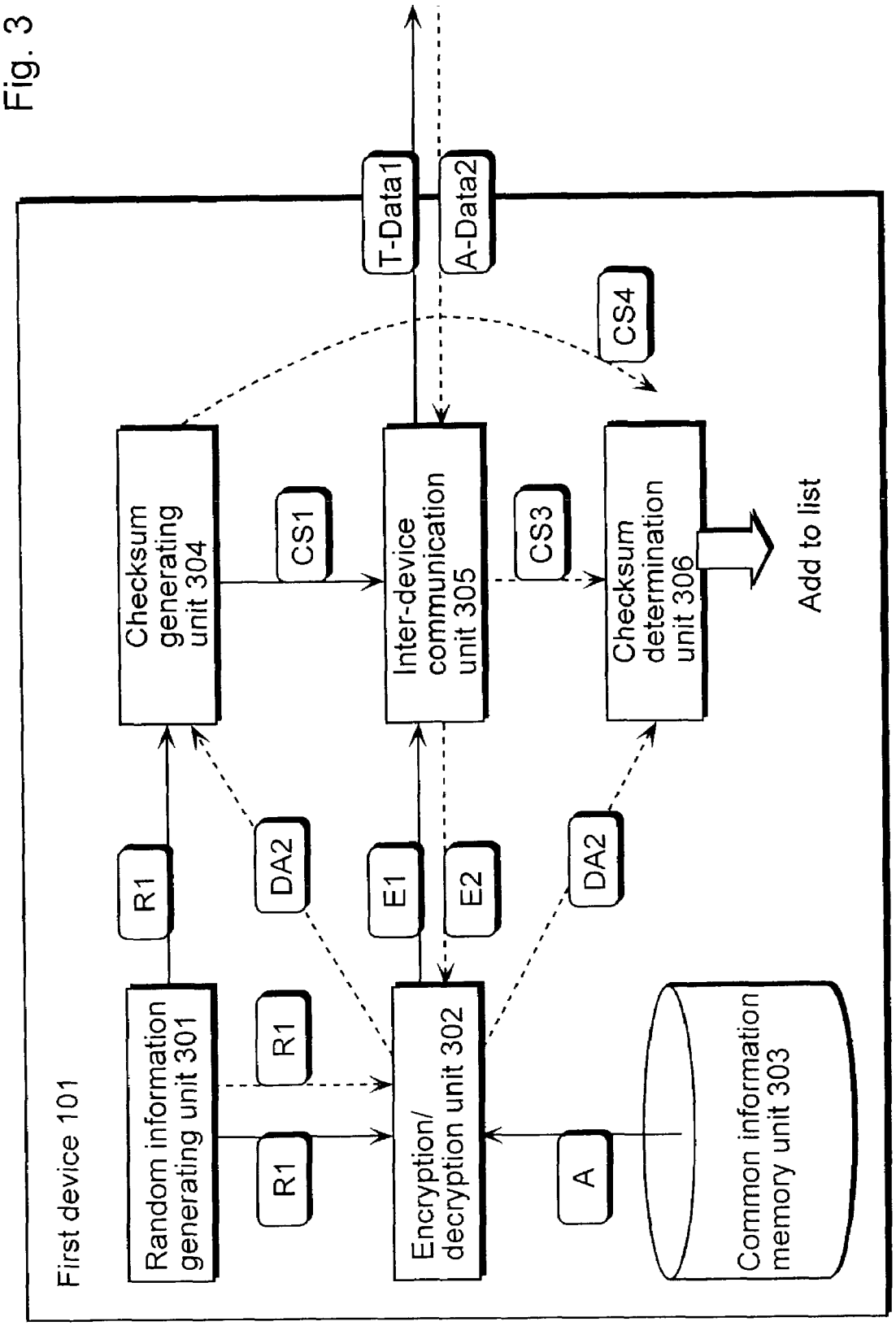
FIG. 3 is a block diagram showing a detailed structure of the first device according to the first embodiment.

FIG. 3 is a block diagram that shows the detailed structure of the first device 101 according to the first embodiment. The first device 101 is a terminal that carries out broadcast and creates a list of devices that belong to the same group as itself. The first device 101 includes a random information generating unit 301 where random byte strings are generated, an encryption/decryption unit 302, a common information memory unit 303 where common information such as passwords are memorized, a checksum generating unit 304, an inter-device communication unit 305 and a checksum determination unit 306. Checksum is information, where data is divided before sending, and the data in each block are converted into numeric values and then added up.

First, the flow of data when the first device 101 sends out transmitting data T-Data 1 to the second device 102 is explained.

The random information generating unit 301 creates random byte strings and uses them as random information R1 such as session key information and padding data. This random information R1 is held in this unit until time-out comes. Here, the time-out means the waiting time that the device will wait for responses from other devices to come, starting from the generation of the random information R1, and is set by the user or the device manufacturer. Meanwhile, the random information generating unit 301 sends random information R1 to the checksum generating unit 304 and the encryption/decryption unit 302.

The encryption/decryption unit 302 encrypts the random information R1 by using the common information A, and sends this encrypted information E1 to the inter-device communication unit 305. The common information memory unit 303 has a hard disk etc. to store the common information A. This common information A is usually kept by the server side, not to be inputted by the user, and the information will be inputted to the common information memory unit 303 by the server side at the time the user signs up for or purchases a device.

The checksum generating unit 304 generates checksum CS1 by adding up the data within each block of checksum target section of the received random information R1, and sends this checksum CS1 to the inter-device communication unit 305. The inter-device communication unit 305, then, makes a packet of transmitting data T-Data 1 from the received checksum CS1 and encrypted information E1, and sends it out as transmitting data T-Data 1 to the second device 102.

Next, the flow of data when the first device 101 receives answering data A-Data 2, which has been sent back from the second device 102, is explained.

First, the inter-device communication unit 305 carries out data transmission between another device, the second device 102. When the inter-device communication unit 305 receives answering data A-Data 2 from the second device 102, the inter-device communication unit 305 sends encrypted information E2 to encryption/decryption unit 302 for decryption, and checksum CS3 that is attached to answering data A-Data 2 to the checksum determination unit 306.

The encryption/decryption unit 302 decrypts the encrypted information E2 by using random information R1, and sends the decrypted answer data DA2 to the checksum generating unit 304. Then, the checksum generating unit 304 generates checksum CS4 by adding up the numeric values of data within each block of the checksum target section of the received decrypted answer data DA2, and sends this checksum CS4 to checksum determination unit 306.

The checksum determination unit 306 maintains a group list, a memory unit which memorizes the devices that belong to the same group. The checksum determination unit 306 compares the aforementioned checksums CS3 and CS4, and if the two checksum values are equal, the checksum determination unit 306 adds the second device 102 to the group list as a device that belongs to the same group. If the two checksum values are not equal, the checksum determination unit 306 determines that the second device 102 does not belong to the same group as itself, and thus will not add the second device 102 to the group list.

It was stated above that decrypted answer data DA2 is sent by the encryption/decryption unit 302. However, the checksum determination unit 306 may send out an acquisition request.

Figure 4:
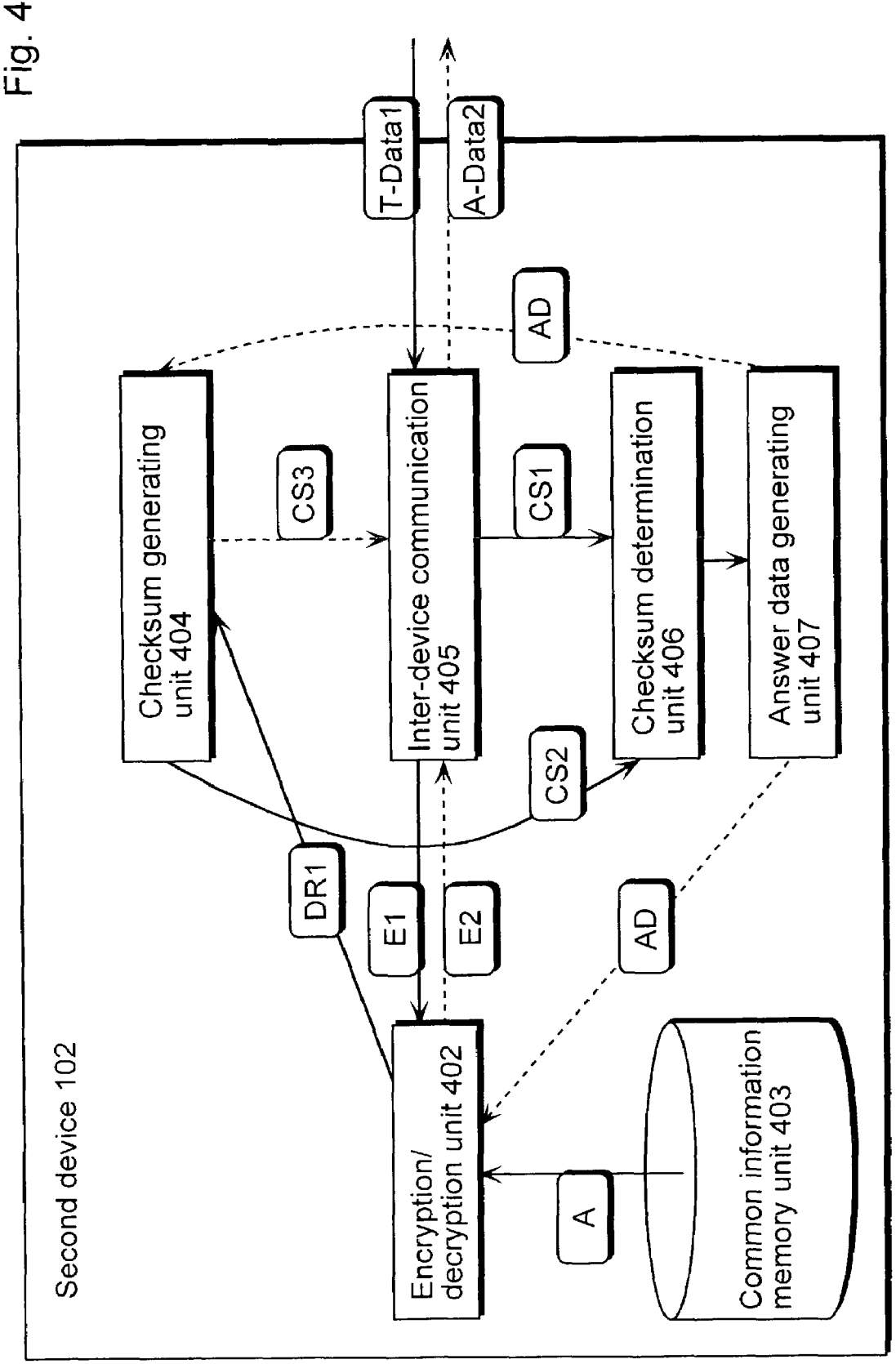
FIG. 4 is a block diagram showing a detailed structure of the second device according to the first embodiment.

FIG. 4 is a block diagram that shows the detailed structure of the second device 102 according to the first embodiment. In addition to the encryption/decryption unit 402, common information memory unit 403, checksum generating unit 404, inter-device communication unit 405 and checksum determination unit 406 that are similar to the first device 101, the second device 102 includes an answer data generating unit 407, which generates answer data AD that includes such information as to certify that the second device 102 belongs to the same group. Here, the random information generating unit 301 that is included in the first device 101 is not included in the second device 102.

Now, the procedure of transmitting data T-Data 1 which has been received by the second device 102 from the first device 101 is explained. When the inter-device communication unit 405 receives the transmitting data T-Data 1, of the transmitting data T-Data 1, the inter-device communication unit 405 sends encrypted information E1 to the encryption/decryption unit 402 and checksum CS1 to checksum determination unit 406.

The encryption/decryption unit 402 decrypts the encrypted information E1 by using common information A that is stored in the common information memory unit 403, and sends the decrypted data DR 1 to the checksum generating unit 404.

The checksum generating unit 404 then generates checksum CS2 by adding up the numeric values of data within each block of the checksum target section of the decrypted data DR1, and sends this checksum CS2 to the checksum determination unit 406. The checksum determination unit 406 compares the aforementioned checksum CS1 with the checksum CS2, and if they are equal, the checksum determination unit 406 directs the answer data generating unit 407 to create answer data AD, since the transmitting data T-Data 1 is now confirmed as data sent from a device that belongs to the same group.

Following this direction, the answer data generating unit 407 generates answer data AD, which includes such data as to certify that the second device 102 belongs to the same group, and sends this answer data AD to the encryption/decryption unit 402 and the checksum generating unit 404. The encryption/decryption unit 402 encrypts the answer data AD by using random information R1 that is included in the encrypted information E1, and send the encrypted answer data to the inter-device communication unit 405 as encrypted data E2. Meanwhile, the checksum generating unit 404 generates checksum CS3 by adding up the numeric values of data within each block of the checksum target section of the answer data AD and sends the checksum CS3 to inter-device communication unit 405. Instead of using random information R1, the encryption can also be carried out by using common information A.

The inter-device communication unit 405, then, generates a packet of answering data A-Data 2 that includes the encrypted data E2 and CS3, and sends the packet of answering data A-Data 2 back to the first device 101. This is the end of a series of data processing carried out in the device authentication system.

Figure 5:
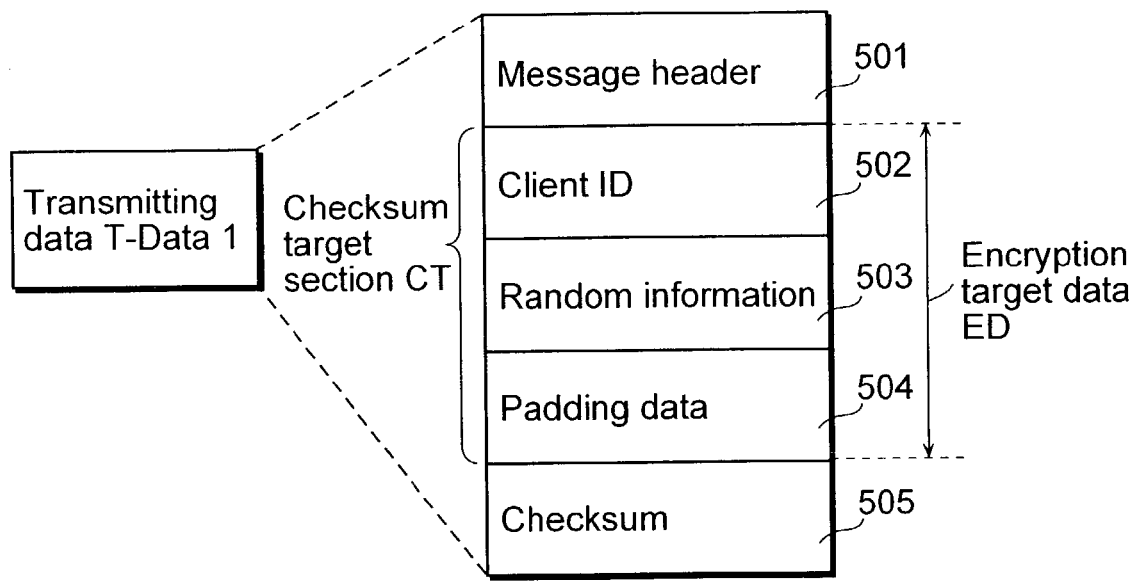
FIG. 5 is a diagram showing a data structure of transmitting data according to the first embodiment.

FIG. 5 is a figure showing the data structure of transmitting data T-Data 1 according to the first embodiment. Note that FIG. 5 is presented as an example to explain the first embodiment.

Transmitting data T-Data 1 is a message sent from the first device 101 to other devices that request other devices to respond as to whether or not they belong to the same group as the first device 101. The transmitting data T-Data 1 includes a message header 501, a client ID 502, random information 503, padding data 504 and a checksum 505.

The message header 501 includes such a message as one that inquires whether or not the receiving device belongs to the same group. The message header 501 is located at the head of the transmitting data T-Data 1 and is sent without being encrypted. The client ID 502 holds the client ID of the first device 101, the sender of the message.

The random information 503 is composed of random byte strings and includes information such as a session key that is used when answering data is encrypted. This session key information is maintained in the first device 101 until the time-out time comes and is used to decrypt the encrypted section of answering data.

The padding data 504 is a spare data. For example, its encryption algorithm is AES, and is attached when the data length of the transmitting data T-Data 1 is not a multiple of 8 bytes, a unit of encryption, so that the transmitting data T-Data 1 becomes a multiple of 8 bytes. The padding data 504 is encrypted by common information, and an encryption target data section ED may be lengthened by using padding data 504 in order to increase the encryption strength. Instead of using the padding data 504, it may also be possible to set a reserve field of approximately 2 bytes.

The checksum 505 holds the sum of the numeric values of data within each block of the checksum target section CT, which includes the client ID 502, random information 503 and padding data 504. Also, instead of using a checksum algorithm such as CRC32, a hash function, for example SHA-1 or MD 5, may be used.

The encryption target data ED includes the client ID 502, the random information 503 and the padding data 504, and the random information 503 is to be at least included. Also, in this encryption target data ED, device identification information that is to uniquely identify the first device 101 on the network may be included. To be specific, this device identification information can be its own IP address or client ID 502, the device's identifier, etc. In case an IP address is necessary, for example when sending back answering data, it is also possible to include an IP address in the transmitting data T-Data 1.

Figure 6:
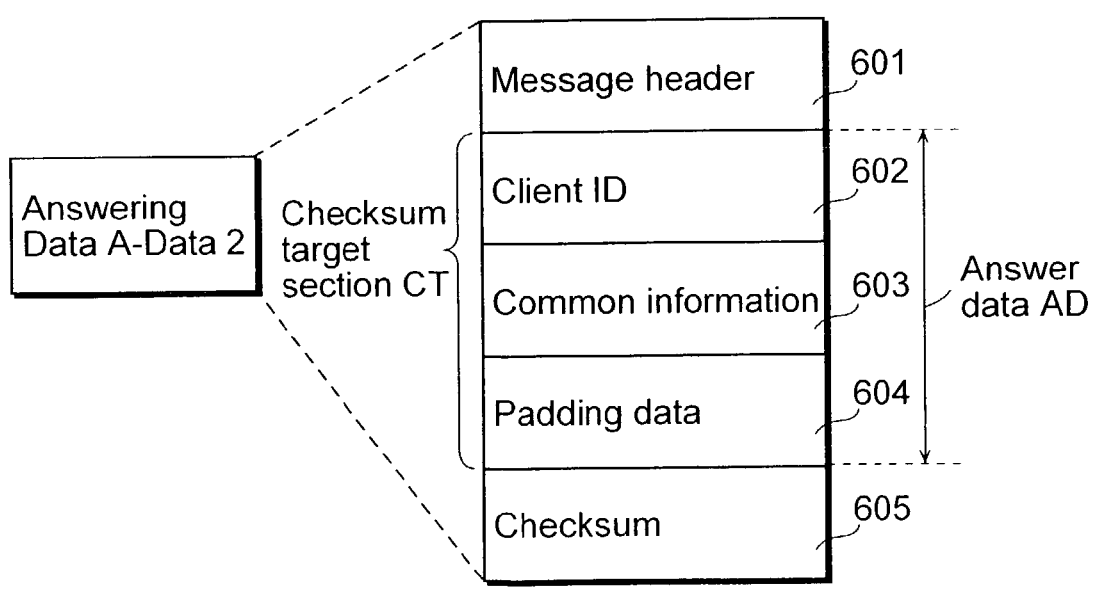
FIG. 6 is a diagram showing a data structure of answering data according to the first embodiment.

Now, with reference to FIG. 6, the contents of answering data A-Data 2 is explained. FIG. 6 shows the data structure of the answering data A-Data 2 according to the first embodiment. Note that FIG. 6 is presented only as an example to explain the first embodiment, and the present invention is not to be limited to this structure.

The answering data A-Data 2 is a reply to the transmitting data T-Data 1, which is an answer requesting message sent from the first device 101. This answering data A-Data 2 includes a message header 601, a client ID 602, common information 603, padding data 604 and a checksum 605.

The message header 601 includes such information as a message as to whether or not the receiving device belongs to the same group, and the client ID 602 is the client ID of the second device 102, the sender of the answering data A-Data 2. The common information 603 is the common information such as passwords held in common by both the first device 101 and the second device 102, and in this first embodiment, it is the common information A.

The padding data 604 is a spare data, and answer data AD can be lengthened by using padding data 604 in order to increase encryption strength. The checksum 605 is the sum of the numeric values of data within each block of the checksum target section CT, which includes the client ID 602, random information 603 and padding data 604.

The answer data AD includes the client ID 602, common information 603 and padding data 604, and common information 603 is included in order to confirm that the second device 102 holds the common information A. This answer data AD is encrypted by using a session key etc. that is included in the aforementioned random information 503 before sending it back.

Also, the answer data AD at least includes device identification information for uniquely identifying the second device 102 on the network. Here, the device identification information can be, for example, its own IP address or client ID 602, the device's identifier. However, although it is stated in the previous sentences that the answer data AD at least includes device identification information, this does not necessarily have to be the case if the message header that complies with the communications protocols given when a plurality of devices communicate includes information equivalent to device identification information (e.g. its own IP address).

Now, as a preparation to use the present invention's device authentication system, here are the examples of how to set common information to devices.

Figure 7B:
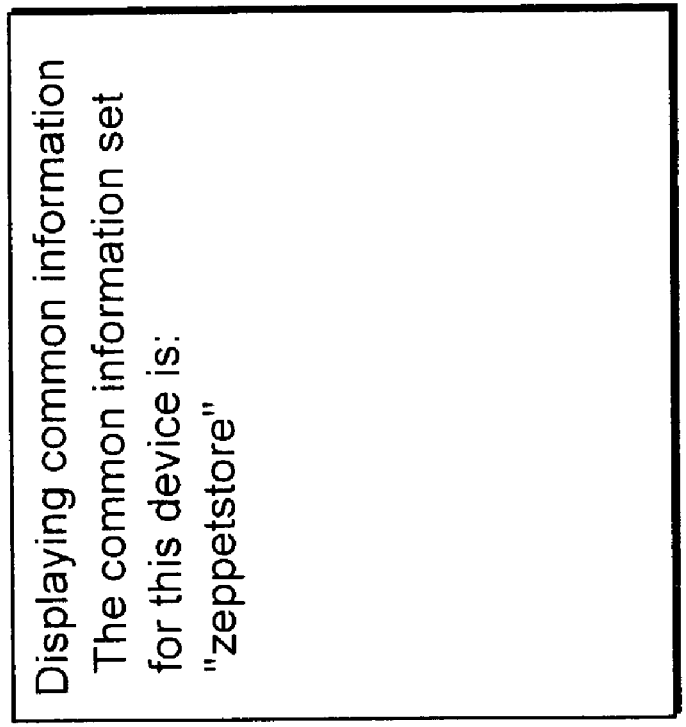
FIG. 7B is a diagram showing another screen of a user interface according to the first embodiment.
Figure 7A:
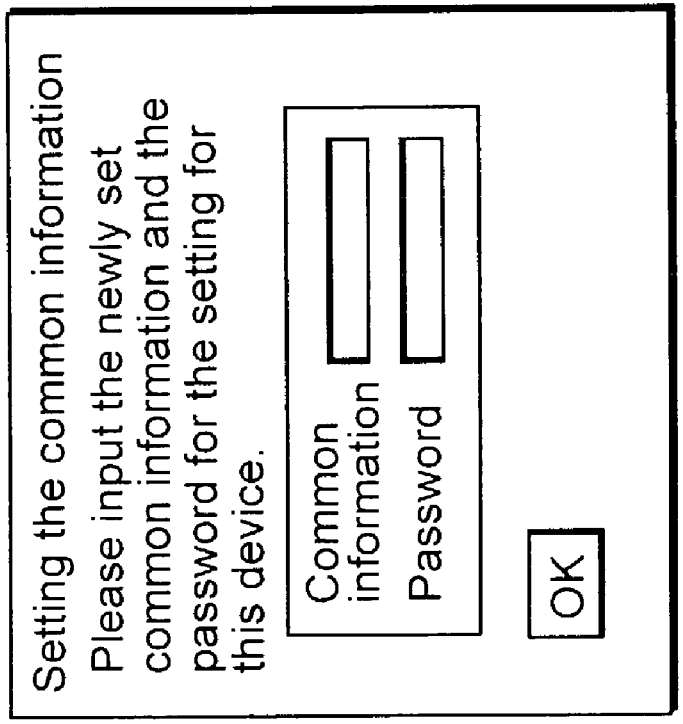
FIG. 7A is a diagram showing a screen of a user interface according to the first embodiment.

FIGS. 7A and 7B are illustrations showing the screens of a user interface (UI) in this first embodiment. The setting range of a group, in this case, is assumed to be a plurality of devices generally owned by a same user. In order to carry out group setting, the user, in one way or another, obtains common information and inputs the information through the UI that is shown in FIG. 7A to devices that belong to the same group. It may also be possible to set up passwords etc. in order to limit users who carry out the setting of the common information to devices. The method of obtaining common information by a user can be, for example, as shown in FIG. 7B, to make the common information of a device be displayed ("zeppetstore", in this case) and the information inputted to other devices that are to belong to the same group. It is also possible that the user obtains common information from device manufacturers or sales outlets by post, e-mail etc, or users may create their own common information and set the information to the devices that are to belong to the same group.

Another possibility is that common information is not to be given to users, but is set by device manufacturers or sales outlets at the time when devices are shipped or sold, according to users' request or the policies of manufacturers or sales outlets. Common information can also be stored in IC cards, and the setting may be made on each device by reading in information from the inserted IC card. Every possible means are assumed for the ways in obtaining IC cards, as has been mentioned in the preceding sentences on obtaining common information. Instead of using IC cards, storage media such as compact flashes, or other storage media that allow secure data management, such as SD cards, can also be used.

Usually, however, common information is not supposed to be inputted by users, but is managed by server sides and will automatically be inputted to each terminal through transmission channels at the time when users join groups or purchase PCs. Since there is a possibility that users will intentionally increase the number of devices that belong to a same group if the users know common information, this method will prevent such cases from occurring.

Next, an example of contents regarding the information items of a group list created by the first device 101 is explained.

Figure 8A:
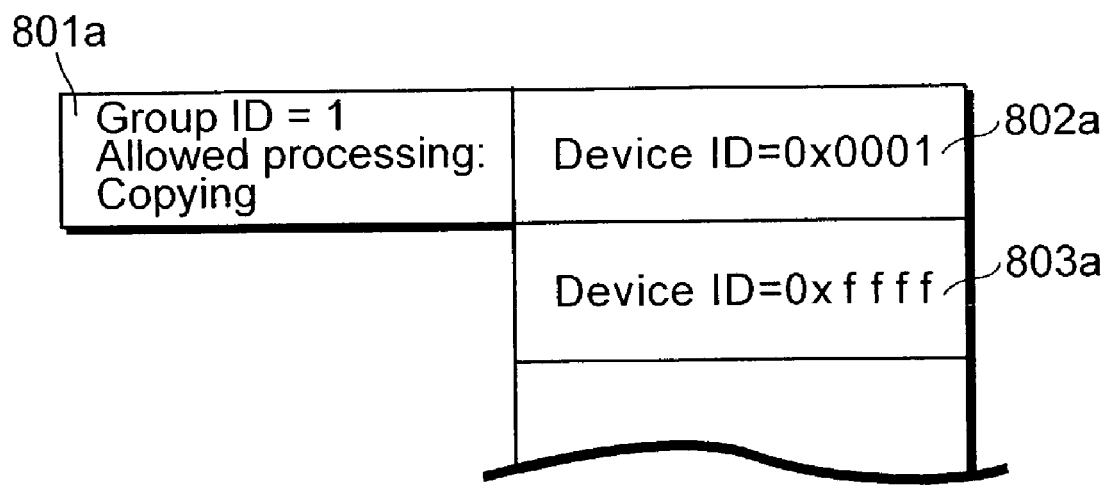
FIG. 8A is a diagram showing information items of a group list created by the first device according to the first embodiment.
Figure 8B:
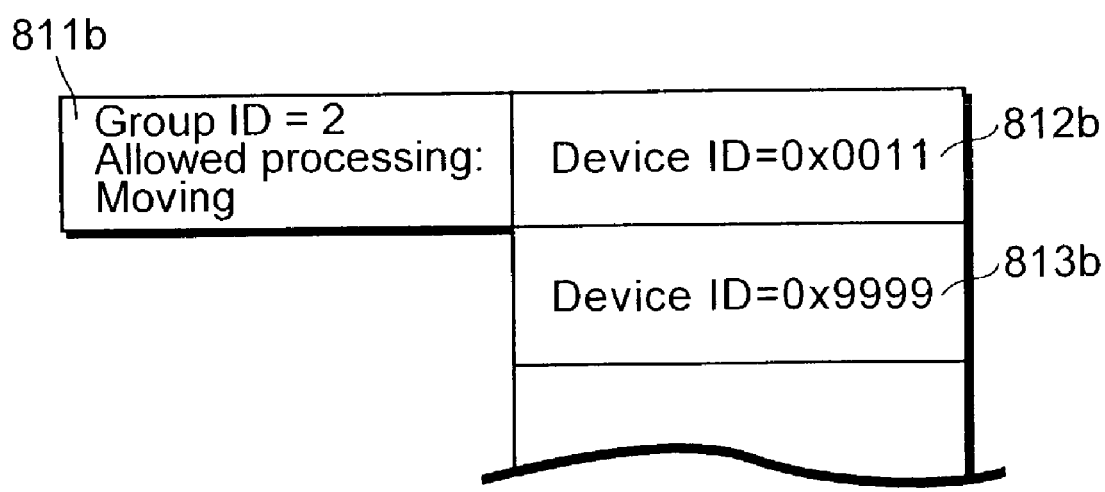
FIG. 8B is a diagram showing information items of another group list created by the first device according to the first embodiment.

FIGS. 8A and 8B are illustrations of the information items of group lists created by the first device 101 in this embodiment. In FIG. 8A, there is an item of group ID (801a) that identifies the group, and identification information of the devices that belong to the group is described to this group ID (801a). As for the identification information of the devices, such information as a device ID (802a, 803a) is described. Also, in correspondence with the group ID (801a), processing that is allowed within the group may be described. This allowed processing in the case of FIG. 8A is "copying", and other possibilities include "reproducing" or "moving".

Similarly, in FIG. 8B, there is an item of a group ID (811b) that identifies the group, and to this group ID (811b), such information as a device ID (812b, 813b) is described as the identification information of devices that belong to the group. In FIG. 8B, the allowed processing within the group is "moving".

Each device can also belong to a plurality of groups, and in that case, each device holds a plurality of common information that respectively correspond to the plurality of groups, and through prescribed processing, it is possible that each device holds a plurality of group lists.

Once a group list is completed, communication is carried out between the devices that are included in the list and processing that is allowed within the group etc. are performed. Subsequent processing such as authentication or content acquisition will be carried out using common methods under secure conditions. If a group list is generated every time any processing including copying or moving is carried out and deleted instantly after the processing is completed, then it will be possible to acquire the latest group information each time any processing is carried out.

In this first embodiment, methods for group setting and group determination are explained so as to be user-oriented, but it is also possible that from the content holders' viewpoint, it is not desirable to expand the domain of a group. In that case, the maximum value of device identification information that can be described in a group list may be set, and it can be specified that at a time a group list is created based on answering data from other terminals, the generation processing of the group list is forcibly terminated when it reaches the maximum value. When this processing is carried out with a presupposition that devices always operate properly and that the network structure is also invariant, users are able to set the number of devices that belong to a same group only up to the maximum value plus a few. At least, this will make it possible to prevent the number of devices within a group from increasing limitlessly.

The setting for a same group has been explained above, but it is basically possible to set devices that belong to the same group quite flexibly and easily by newly inputting or deleting common information.

Now, the operation of the device authentication system according to the first embodiment that is structured in the manner as described above is explained.

Figure 9:
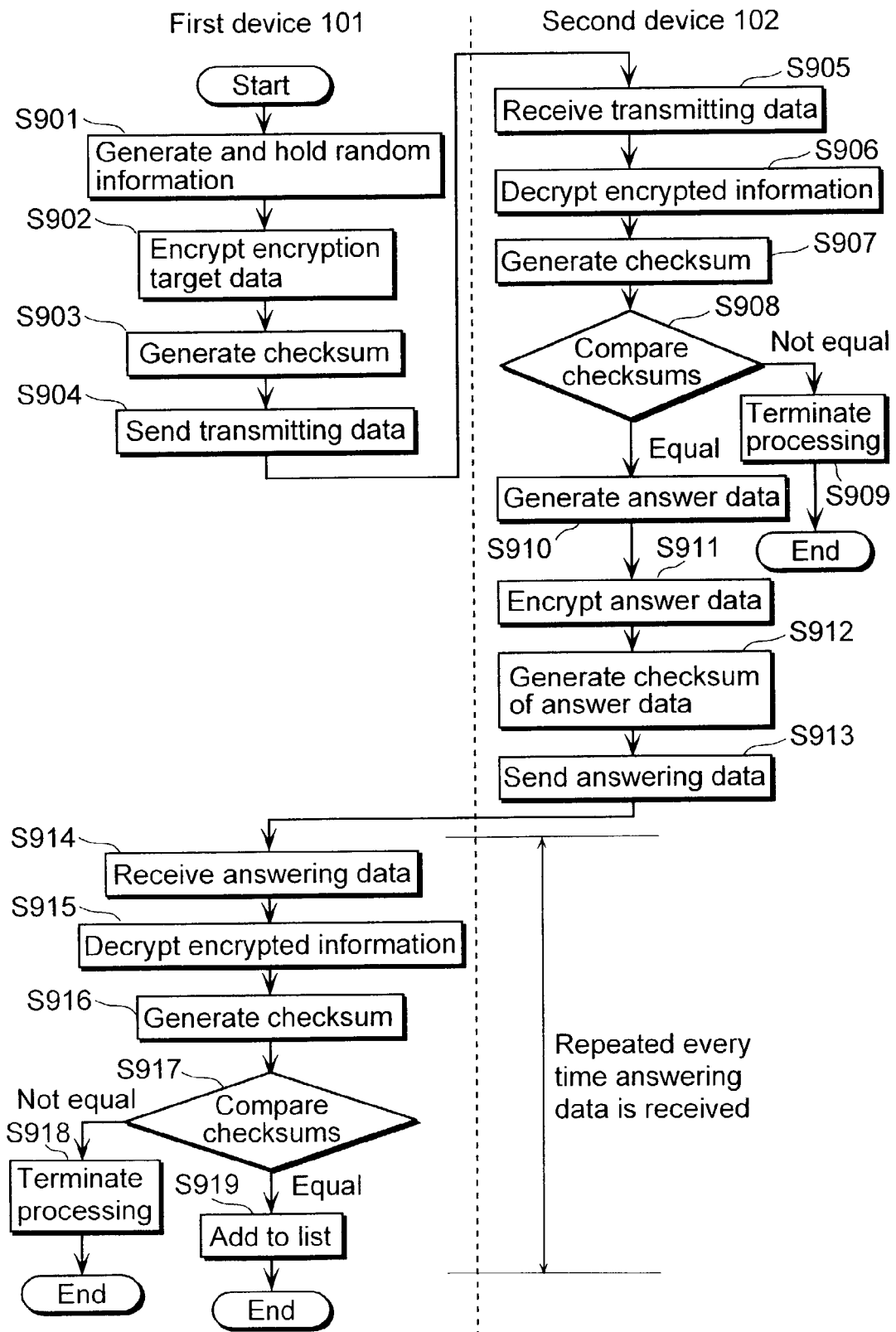
FIG. 9 is a flowchart showing a group determination processing of a device authentication system according to the first embodiment.

FIG. 9 is a flowchart showing the procedure of a group determination of the device authentication system according to the first embodiment. In this first embodiment, an explanation is given based on the first device 101 determining whether or not the second device 102 belongs to the same group, but by using the similar device authentication system, it is also possible to carry out a group determination between a plurality of terminals via broadcast etc. Also, in explaining the operation of the device authentication system, reference is made to the codes used in FIGS. 3 and 4.

First, the random information generating unit 301 that is included in the first device 101 generates random information R1 and sends the generated random information R1 to the encryption/decryption unit 302 and the checksum generating unit 304 that also are included in the first device 101 (S901). In this first embodiment, the random information generating unit 301 must maintain the random information R1 until the time-out comes. Alternatively, even before the time-out comes, the random information R1 may be deleted from the random information generating unit 301 in accordance with the direction of a termination given by the user. The random information R1 is a random byte string of several bytes, and the byte count depends on the encryption algorithm etc. used for encryption/decryption processing.

When the encryption/decryption unit 302 receives the random information R1 from the random information generating unit 301, the encryption/decryption unit 302 sends a common information acquisition request to the common information memory unit 303 and then receives the common information A from the common information memory unit 303. Next, the encryption/decryption unit 302 generates encrypted information E1 by encrypting the encryption target data ED, which at least includes the random information R1, by using the common information A as a key, and sends the encrypted data to the inter-device communication unit 305 (S902). Here, for encryption algorithm, the one that has enough encryption strength to actual usage is usually adopted, where DES, Triple DES and AES are some examples. In the following explanation, the encryption/decryption unit 302 and the encryption/decryption unit 402 in FIG. 4 are assumed to hold one encryption algorithm that is the same, but they may also hold a plurality of encryption algorithms. However, in the case where a plurality of encryption algorithms are held, encryption algorithm identifiers become necessary, and both the first device 101 and the second device 102 must hold the same encryption algorithms that correspond to the aforementioned encryption algorithm identifiers.

Next, the checksum generating unit 304 generates the checksum CS1 of the aforementioned encryption target data ED, which at least includes the random information R1, and sends the checksum CS1 to the inter-device communication unit 305 (S903).

When the inter-device communication unit 305 receives both the encrypted information E1 and CS1, the inter-device communication unit 305 sends, to other devices, transmitting data T-Data 1, which at least includes the encrypted information E1 and CS1 and has a message header etc. that complies with the attached communication protocol (S904).

Now, when the inter-device communication unit 405 that is included in the second device 102 receives the transmitting data T-Data 1 from the first device 101, the inter-device communication unit 405 extracts the encrypted information E1 and CS1 from the transmitting data T-Data 1 (S905).

Then, the inter-device communication unit 405 sends encrypted information E1 to the encryption/decryption unit 402 and the checksum CS1 to the checksum determination unit 406, both of which are included in the second device 102.

When the encryption/decryption unit 402 receives the encrypted information E1, the encryption/decryption unit 402 sends a common information acquisition request to the common information memory unit 403, and receives common information A from the common information memory unit 403. The encryption/decryption unit 402 then decrypts the encrypted information E1 by using the common information A as a key and obtains decrypted encrypted information (hereinafter referred to as "decrypted encryption target data") DR1 and sends the decrypted encryption target data DR1 to the checksum generating unit 404 (S906). The encryption/decryption unit 402 maintains the decrypted encryption target data DR1 until answer data AD will be sent from the answer data generating unit 407.

Now, the checksum generating unit 404 generates the checksum CS2 of the decrypted encryption target data DR1 that was received, and sends the generated checksum CS2 to the checksum determination unit 406 (S907). The checksum determination unit 406 then carries out the comparison process of received checksums CS1 and CS2 (S908).

If the result of comparison processing was CS1=CS2, then the checksum determination unit 406 sends a control code indicating that the checksums were equal, or if the result was CS1≠CS2, then the checksum determination unit 406 sends a control code indicating that the checksums were not equal. In both cases, the checksum determination unit 406 sends the control code to the answer data generating unit 407.

If the answer data generating unit 407 receives a control code indicating that the checksums were not equal, the answer data generating unit 407 does not generate any answer data (S909). The answer data generating unit 407 can also be made to fill answer data AD by padding data, which is meaningless byte strings, etc., or describe an error code, but in this first embodiment, the explanation is given based on an assumption that answer data AD is not generated if the checksums were not equal. Alternatively, it is also possible to make the checksum determination unit 406 not send a control code to the answer data generating unit 407 if the checksums were not equal.

Then, the answer data generating unit 407 generates answer data AD in accordance with the received control code, and sends the answer data AD to the encryption/decryption unit 402 and the checksum generating unit 404 (S910).

Because it is determined that a device which has sent back proper answer data AD to the first device 101 at least belongs to the same group, the same determination can be made when the checksums were not equal because of communication errors.

Now, the encryption/decryption unit 402 extracts the random information R1 from the decrypted encryption target data DR1 that it has been maintaining. By using this random information R1 that includes a session key etc., the encryption/decryption unit 402 encrypts the received answer data AD, generates encrypted information E2, and sends the encrypted information E2 to the inter-device communication unit 405 (S911). Meanwhile, the checksum generating unit 404 generates checksum CS3 of the received answer data AD and sends the checksum C3 to the inter-device communication unit 405 (S912). When the inter-device communication unit 405 receives both the encrypted information E2 and the checksum CS2, the inter-device communication unit 405 sends answering data A-Data 2, which at least includes the encrypted information E2 and checksum CS3 and has a message header etc. that complies with the attached communication protocol, to the first device 101 (S913).

When the inter-device communication unit 305 that is included in the first device 101 receives the answering data A-Data 2 from the second device 102, the inter-device communication unit 305 extracts the encrypted information E2 and checksum CS3 from the data (S914). Then, the inter-device communication unit 305 sends the encrypted information E2 to the encryption/decryption unit 302, and sends the checksum CS3 to the checksum determination unit 306.

When the encryption/decryption unit 302 receives the encrypted information E2 from the inter-device communication unit 305, the encryption/decryption unit 302 sends a random information acquisition request to the random information generating unit 301 and receives random information R1 from the random information generating unit 301. The encryption/decryption unit 302, then, decrypts the received encrypted information E2 by using the received random information R1 as a key, obtains decrypted encrypted information (hereinafter referred to as "decrypted answer data") DA2, and sends the decrypted answer data DA2 to the checksum generating unit 304 and the checksum determination unit 306 (S915). When sending the data to the checksum determination unit 306, it is also possible to extract device identification information from the decrypted answer data DA2 and send it as well.

Now, the checksum generating unit 304 generates the checksum CS4 of the received decrypted answer data DA2 and sends the generated checksum CS4 to checksum determination unit 306 (S916). The checksum determination unit 306 carries out comparison processing of the received checksums CS3 and CS4 (S917).

If the result of the comparison processing is CS3=CS4, then it is determined that the second device 102, which sent the answer data AD, belongs to the same group, and the second device 102 is added to the list as a device that belongs to the same group (S919). Meanwhile, if the result is CS3≠CS4, then it is determined that the second device 102 does not belong to the same group and the processing is terminated (S918). For the same reason as in the case when the result of the checksum comparison performed by the second device 102 was not equal, the same determination is made if checksums were not equal because of transmission errors. This concludes the detailed explanation of device authentication system between the first device 101 and the second device 102.

Note that in this first embodiment, encryption target sections are, respectively, encryption target data ED and answer data AD for transmitting data T-Data 1 and answering data A-Data 2, and checksum 505 and checksum 605 are not included. It is also possible, however, to carry out encryption including checksum 505 and checksum 605.

To be specific, at the time when the transmitting data T-Data 1 is created in the first device 101, both the checksum target section CT and checksum 505 can be encrypted by using the common information A after the checksum 505 of checksum target section CT is calculated. Then, the transmitting data T-Data 1 that includes the checksum target section CT and checksum 505, both being encrypted, can be sent to the second device 102. Meanwhile, at the side of the second device 102, the received transmitting data T-Data 1 is decrypted by using the common information A and after the prescribed processing is carried out, both the encrypted information E2 and checksum CS3 can be encrypted by using random information 503 and then sent back as the answering data A-Data 2.

As has been explained, in the device authentication system according to this first embodiment, the transmitting data T-Data 1 that is sent from the first device 101 includes the encryption target data ED, which includes random information 503 etc., that is encrypted by using common information A, and checksum 505. The second device 102 decrypts the encryption target data ED by using the common information A and by carrying out a comparison processing of checksum 505, the second device 102 determines whether or not the first device 101 belongs to the same group. If the first device 101 belongs to the same group, then the second device 102 sends back the answering data A-Data 2, which includes encrypted information E2 that has been encrypted by using the random information 503 and checksum 605, to the first device 101. When the first device 101 receives the answering data A-Data 2, the first device 101 decrypts the answer data AD by using the random information 503 that has been maintained, determines whether or not the second device 102 belongs to the same group by carrying out a comparison processing of the checksum 605, and if checksums are equal, the first device 101 adds the second device 102 to the group list.

Consequently, in the device authentication system of this first embodiment, the first device 101 is able to create, by itself, a group list of devices that belong to the same group without sending common information A to other devices, and this allows the first device 101 to securely obtain a group list of devices that belong to the same group before it carries out processing such as authentication processing or content transmission processing, which will give a heavy load to the first device 101.

In addition, in the device authentication system of this first embodiment, the first device 101 is able to create, by itself, a group list of devices that belong to the same group independently from a server, and will be effective in carrying out grouping among a plurality of devices via broadcast etc.

Also, in the device authentication system according to this first embodiment, in case the where each terminal is treated to be at an equal level as a terminal that holds the common information A, then by deciding to which devices it will send data according to the aforementioned group list, each device will not make transmission to devices that are not allowed to acquire the content. Thus, it will be possible to make efficient use of communication network, reduce traffic and so on.

Furthermore, in this first embodiment, by using the random information R1, which are random numbers, for the encryption and decryption of the answering data A-Data 2, data transmission between the first device 101 and the second device 102 can be made more securely and avoid more effectively such attacks as replay attacks, which is a way of attacking computers by obtaining the content of prior communications and sending the same content pretending to be the sender of the content.

So far, in this first embodiment, it has been explained that the data transmitted between devices includes the message header 501, the encryption target data ED that is encrypted, and the checksum of this encryption target data ED, and a comparison processing of the checksum is carried out in the second device 102, the receiving side. It is also possible, however, to include pre-decided fixed information in the encryption target data ED, and the receiving side judges whether or not the sending device holds the same common information A by checking whether or not the fixed information is included. In this case, the data transmitted between the devices may include the message header 501 and encrypted encryption target data ED, which includes the fixed information. Including fixed information means, for example, to insert a letter string such as "Hello" at the head of encryption target data ED.

Also, in this embodiment, the determination as to whether or not the other device belongs to the same group is carried out by using the common information A by the second device, but it is possible that the determination as to whether or not a device belongs to the same group is carried out not by the second device 102, but only by the first device 101. It is possible, for example, that the second device 102 decrypts the received encrypted information E1 by using common information A and obtains the random information R1. Without carrying out a checksum determination (without judging whether or not the same common information A is held), however, the second device 102 encrypts answer data AD by using the aforementioned random information R1 and sends the encrypted answer data AD back to the first device 101. The first device 101 then decrypts the data, determines whether or not the obtained data is correct as the answer data AD, and thus determines whether or not the sending device belongs to the same group.

The Second Embodiment

A device authentication system according to the second embodiment of the present invention will now be explained. In this second embodiment, the points that differ from the first embodiment will mainly be described in order to simplify the explanation. This second embodiment pertains to a content distribution system where digital products (content) and right information (license) that enable users to utilize the content are managed in separate forms, and are distributed from a server to terminals via networks. In the second embodiment, an example of applying the system for searching for a license that is memorized in other terminals within the same group is described.

Figure 10:
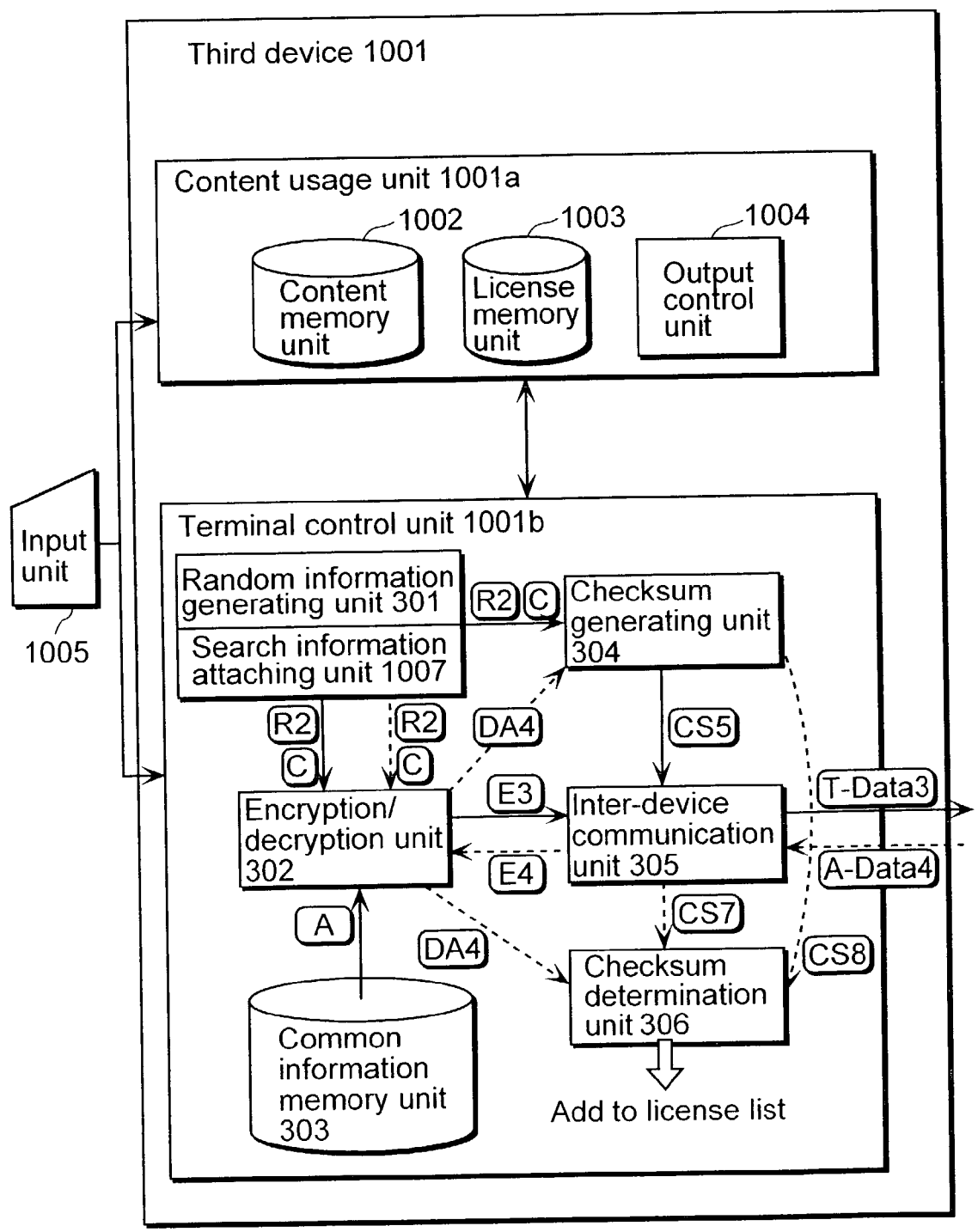
FIG. 10 is a block diagram showing a detailed structure of the third device according to a second embodiment of the present invention.

FIG. 10 is a block diagram that shows a detailed structure of the third device 1001 according to this second embodiment. In this second embodiment, the third device 1001 includes a content usage unit 1001a, an input unit 1005 and a search information attaching unit 1007, in addition to the structure of the aforementioned first device 101.

The content usage unit 1001a is used when downloading contents such as movies or music as well as a license from a server via networks such as broadband. The content usage unit 1001a includes a content memory unit 1002 where contents such as movies are memorized, a license memory unit 1003 where licenses that are issued by the server upon request from terminals, that are PC users etc., as well as an output control unit 1004 which manages the contents memorized in the content memory unit 1002 in accordance with the usage rules permitted by license. However, the structure of content usage unit 1001a is only an example for explanation and the structure is not to be limited to this second embodiment.

The content memory unit 1002 memorizes contents that are downloaded from the server via broadband etc. when the users of the terminals carry out a purchase procedure. These contents are usually sent to the third device 1001 after being encrypted at the server by using a content key.

In the license memory unit 1003, a license obtained by the terminal users etc. that is issued by the server upon the users' request is memorized. A license is data that gives usage permission of contents to clients and includes such information as a content ID of the contents to which the license is associated with, an action ID that states the form of usage of the contents, and a content key that decrypts the encrypted contents, and furthermore, it memorizes usage rule data that indicates the usage rules of contents in the devices. In the usage rule data, information such as a valid period (e.g. from Jun. 1, 2002 to Aug. 31, 2002), a maximum number of times that usage is allowed (e.g. allowed to reproduce once), or a maximum time length for each continuous reproduction (e.g. ten hours per reproduction is allowed at a maximum) are included. Usage rules that are managed by the server are, for example, usage rules included in the license and information that can be acquired and managed by the server (e.g. a usage record of a user or a list of devices possessed by the user).

The output control unit 1004 has, or is connected to via cables, reproduction devices such as a television, a speaker or a printer, and the user of the third device 1001 utilizes contents with these reproduction devices within the scope of usage permission of the license. By connecting the output control unit 1004 to recording devices, it is also possible to record the contents to storage media such as a DVD or SD.

The input unit 1005 is connected with the third device 1001 via a network, and inputs data such as a content, license or user information to the content usage unit 1001a that is included in the third device 1001. This input unit 1005 is controlled by the server side that has databases.

A terminal managing unit 1001b of the third device 1001 includes, in addition to the structure of the first embodiment, a search information attaching unit 1007. The flow of data when the third device 1001 sends transmitting data T-Data 3 to other devices is as follows. First, the random information generating unit 301 and the search information attaching unit 1007 generate random information R2 and search information C. In this search information C, information on content ID and action ID that is allowed to be utilized under the license that is subject to searching is included. It is also possible to include other information in this search information C. Then, by using the common information A, the encryption/decryption unit 302 generates encrypted information E3 that includes the search information C and the random information R2, and sends this encrypted information E3 to the inter-device communication unit 305. The checksum generating unit 304, meanwhile, generates checksum CS5 from the random information R2 and the search information C, and the inter-device communication unit 305 sends the transmitting data T-Data 3, which includes the encrypted information E3 and checksum CS5, to the fourth device 1101.

Now, the flow of data when the third device 1001 receives the answering data A-Data 4 from other devices is as follows. First, of answering data A-Data 4 that was received from the fourth device 1101, the inter-device communication unit 305 sends encrypted data E4 to the encryption/decryption unit 302 for decryption, while sending checksum CS7 to the checksum determination unit 306. The encryption/decryption unit 302 then decrypts the encrypted data E4 by using random information R2 that it has been maintaining, and sends this decrypted answer data DA4 to the checksum generating unit 304. When the checksum determination unit 306 receives checksum CS8 that was generated by the checksum generating unit 304, the checksum determination unit 306 compares the checksums CS7 and CS8 and if the result of the comparison is that CS7 and CS8 are equal, the information of the license that applies to the search information C and is held by the fourth device 1101 is added to the license list created by the third device 1001.

Figure 11:
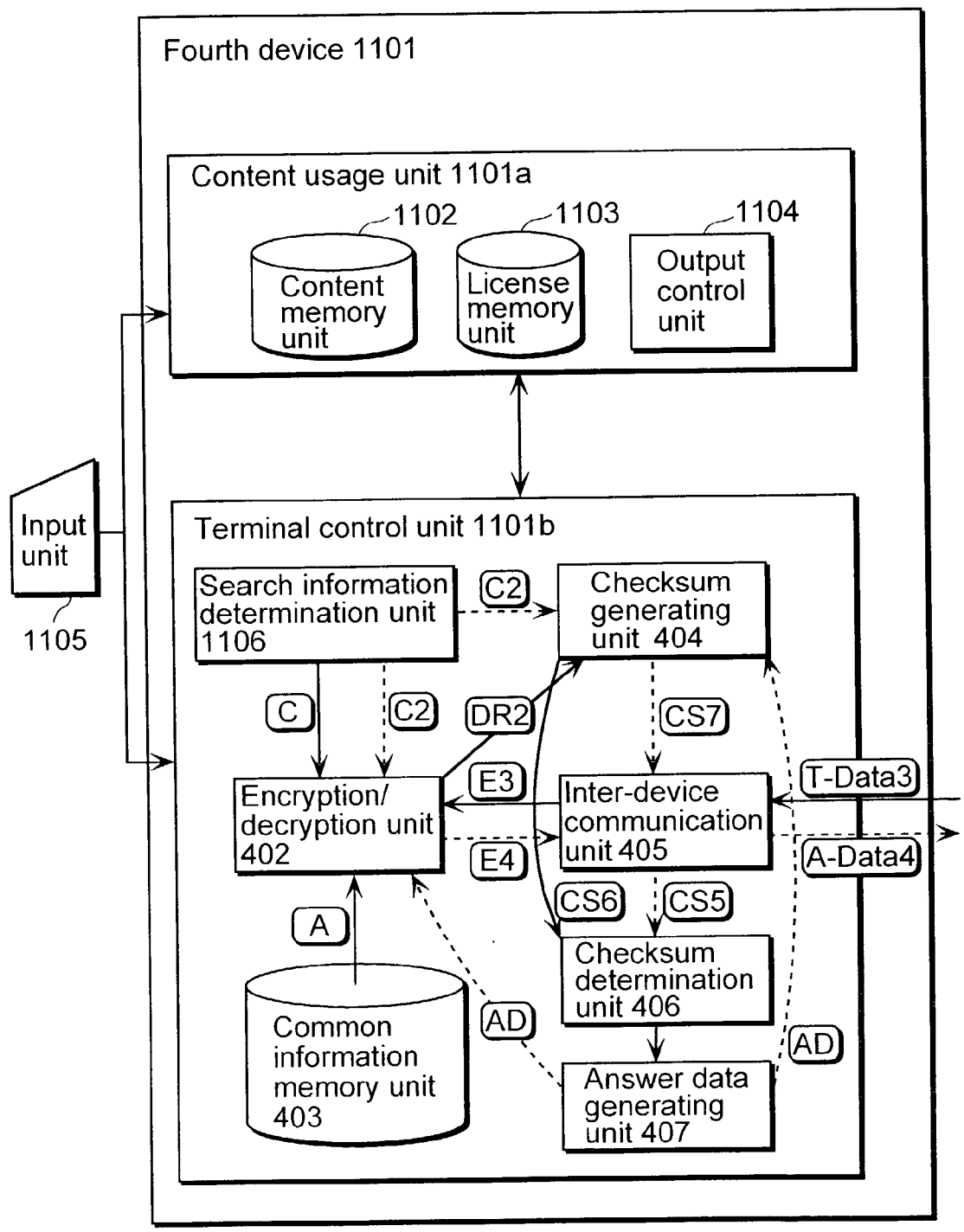
FIG. 11 is a block diagram showing a detailed structure of the fourth device according to the second embodiment.

FIG. 11 is a block diagram that shows a detailed structure of the fourth device 1101 according to the second embodiment. Similar to the third device 1001 described above, the fourth device 1101 includes a content usage unit 1101a, an input unit 1105 and a terminal management unit 1101b. The structure of the content usage unit 1101a is similar to the aforementioned content usage unit 1001a.

In addition to the structure in the first embodiment, the terminal management unit 1101b includes a search information determination unit 1106. The flow of data from the time the terminal management unit 1101b receives transmitting data T-Data 3 until it sends out a response is as follows. First, the inter-device communication unit 405 receives transmitting data T-Data 3 and sends encrypted information E3 to the encryption/decryption unit 402 and checksum CS5 to the checksum determination unit 406. The encryption/decryption unit 402 decrypts the encrypted information E3 by using the common information A, sends the decrypted encryption target data DR2 to the checksum generating unit 404, and checksum CS6 generated there is sent to the checksum determination unit 406. The checksum determination unit 406 then compares the checksums CS5 and CS6. If the result of comparison is that the checksums CS5 and CS6 are not equal, the fourth device 1101 ignores transmitting data T-Data 3, but if checksums CS % and CS6 are equal, the search information determination unit 1106 searches content usage unit 1101a and retrieves a license that corresponds to the content that applies to the search information C. If no license that satisfies the search information C is found, then the answer data generating unit 407 does not create any answer data AD, but if a license that satisfies the search information C is found, then encrypted information E4 that includes license information C2 and answer data AD is created. Then, the inter-device communication unit 405 sends answering data A-Data 4, which includes the encrypted information E4 as well as checksum CS7 generated from license information C2 and answer data AD, to the third device 1001.

Figure 12:
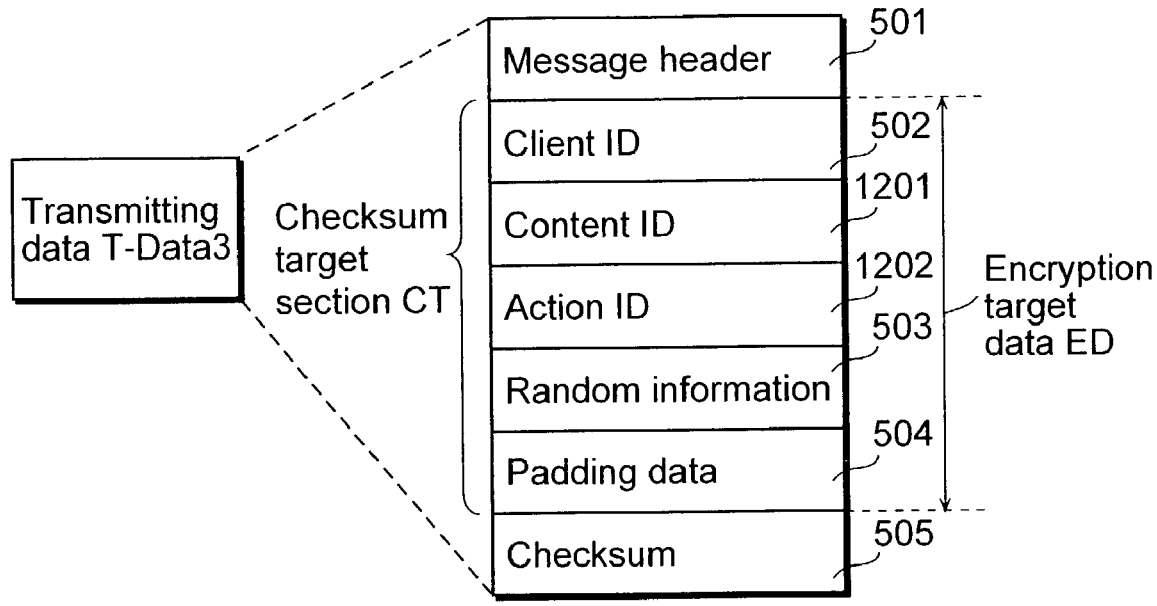
FIG. 12 is a diagram showing a data structure of transmitting data according to the second embodiment.

FIG. 12 is a diagram showing the data structure of the transmitting data T-Data 3 according to this second embodiment. Note that FIG. 12 is only an example to explain the second embodiment.

The transmitting data T-Data 3 is a message that requests other devices to determine whether they belong to the same group as the third device 1001, as well as to carry out a search for a license that applies to search information. In addition to the structure of transmitting data T-Data 1 explained in the first embodiment, the transmitting data T-Data 3 includes data on a content ID 1201 and an action ID 1202.

The content ID 1201 indicates the ID of a requested content. To any content, at least an identifier is allotted to each content in order to uniquely identify the contents, and usually, this identifier is used as the content ID 1201. The content ID 1201 is the ID of the content that corresponds to the license that is subject to searching.

The action ID 1202 is an identifier that specifies the form of usage of a content indicated by the aforementioned content ID 1201, and is also an ID for the action allowed under the license that is subject to searching. The action, in this case, includes listening, reproducing, copying, moving or printing.

The content ID 1201 and action ID 1202 are included within encryption target data ED that is encrypted by using the common information A before being sent out. Similar to the first embodiment, it is also possible in the second embodiment to encrypt, by using the common information A, not only the encryption target data ED but also checksum 505 before sending.

Figure 13:
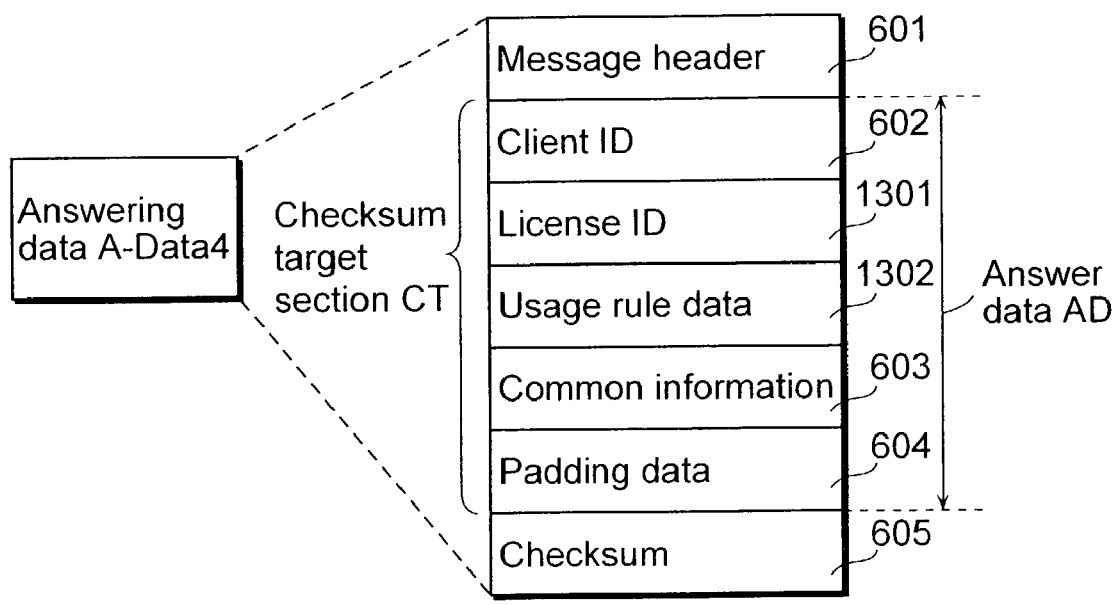
FIG. 13 is a diagram showing a data structure of answering data according to the second embodiment.

FIG. 13 is a diagram showing an example of the data structure of the answering data A-Data 4 according to this second embodiment. This answering data A-Data 4 is a response to the transmitting data T-Data 3 that has been sent from the third device 1001, and in addition to the structure of answering data A-Data 2 of the first embodiment, the answering data A-Data 4 includes a license ID 1301 and a usage rule data 1302.

The license ID 1301 itself is not a license, which is right information, but it is an identification number of a license that can be used for the contents of search information C, and in this second embodiment, the license ID 1301 is a number used for identifying a license that was searched for in the fourth device 1101, a terminal subject to the searching.

The usage rule data 1302 is data that indicates the usage rules of content permitted by license, and is usually included in the license. In this second embodiment, the usage rule 1302 includes information such as search information C rules, which determines whether an action—the operation of contents, e.g. listening—can be commenced under the rules determined by the third device 1001 (e.g. for ten times).

Both the license ID 1301 and usage rule data 1302 are included in the answer data AD that is encrypted by using the random information R2.

Figure 14:
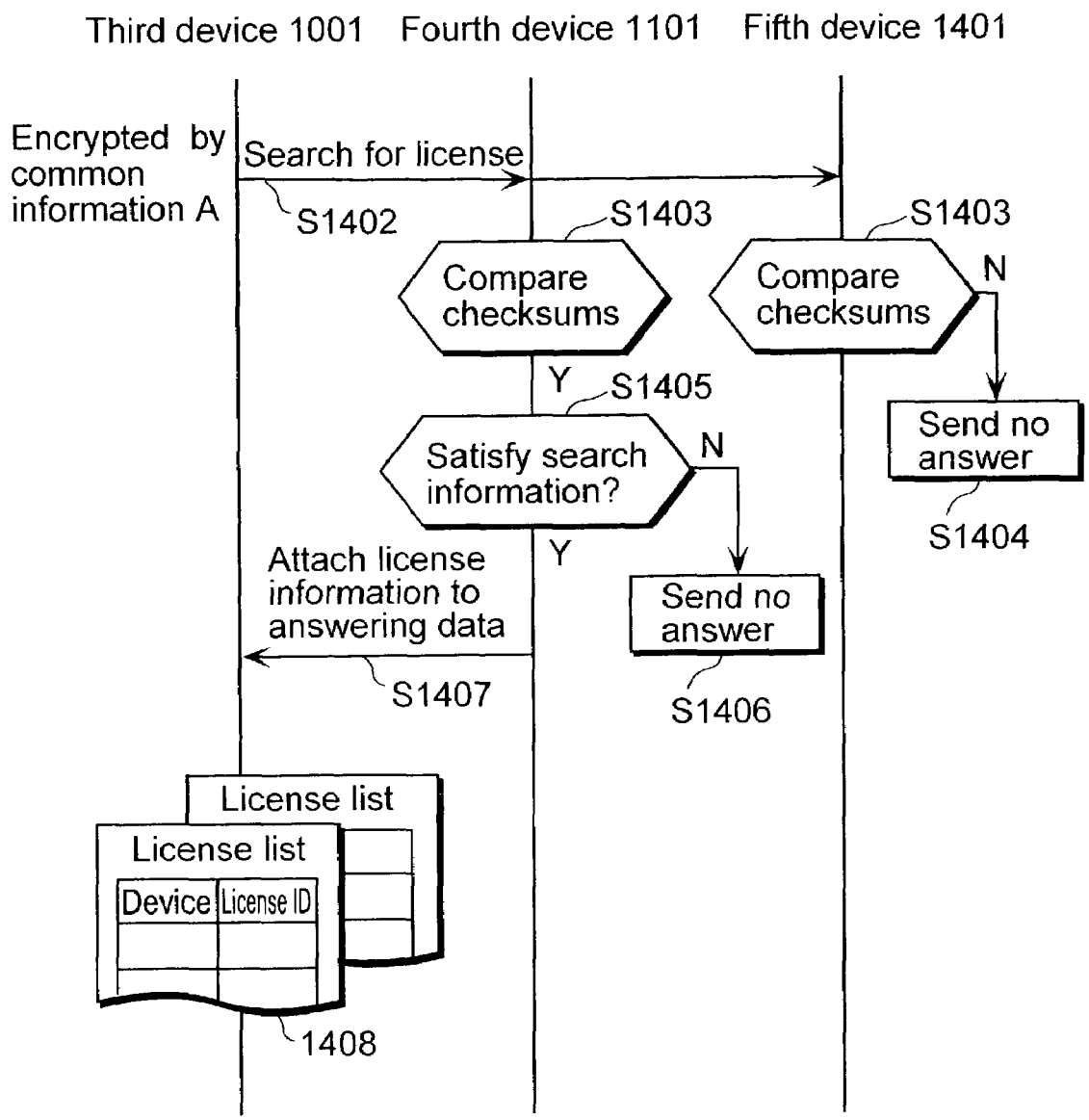
FIG. 14 is a sequence diagram showing a transmission procedure that is performed when the third device carries out a license search, by using search information, to the fourth device and the fifth device according to the second embodiment.

FIG. 14 is a sequence diagram that shows the transmission procedure when the third device 1001, using the search information C, carries out license searching for the fourth device 1101 and the fifth device 1401 according to the second embodiment. Note that in this diagram, it is assumed that the fifth device 1401 does not hold the common information A.

The third device 1001 searches for a license memorized in other terminals that belong to a same group, and creates a license list of devices that hold a license of content included in the search information C. In order to carry out this processing, the third device 1001 sends transmitting data that includes search information C and that is encrypted by using the common information A to the fourth device 1101 and the fifth device 1401 (S1402). In this second embodiment, the transmission is made via broadcast.

When the fourth device 1101 and the fifth device 1401 receive the transmitting data, they decrypt the encrypted section of data of the transmitting data by using the common information A, and carry out a checksum comparison (S1403). Although the fifth device 1401 receives the transmitting data, because it does not hold the common information A, the decryption of the encrypted transmitting data is not carried out properly causing checksum to be unequal, and thus will not send back any answering data (S1404).

Meanwhile, the fourth device 1101 carries out a determination as to whether the common information A as well as the search information C are satisfied (S1405). If they are satisfied, then the fourth device 1101 will send back answering data with license information attached (S1407), but if they are not satisfied then no response is sent back (S1406). Then, the third device 1001 creates a license list 1408 that satisfies the search information C, as shown in FIG. 14, and according to this license list 1408, the third device 1001 determines to which devices it will send data.

Figure 15:
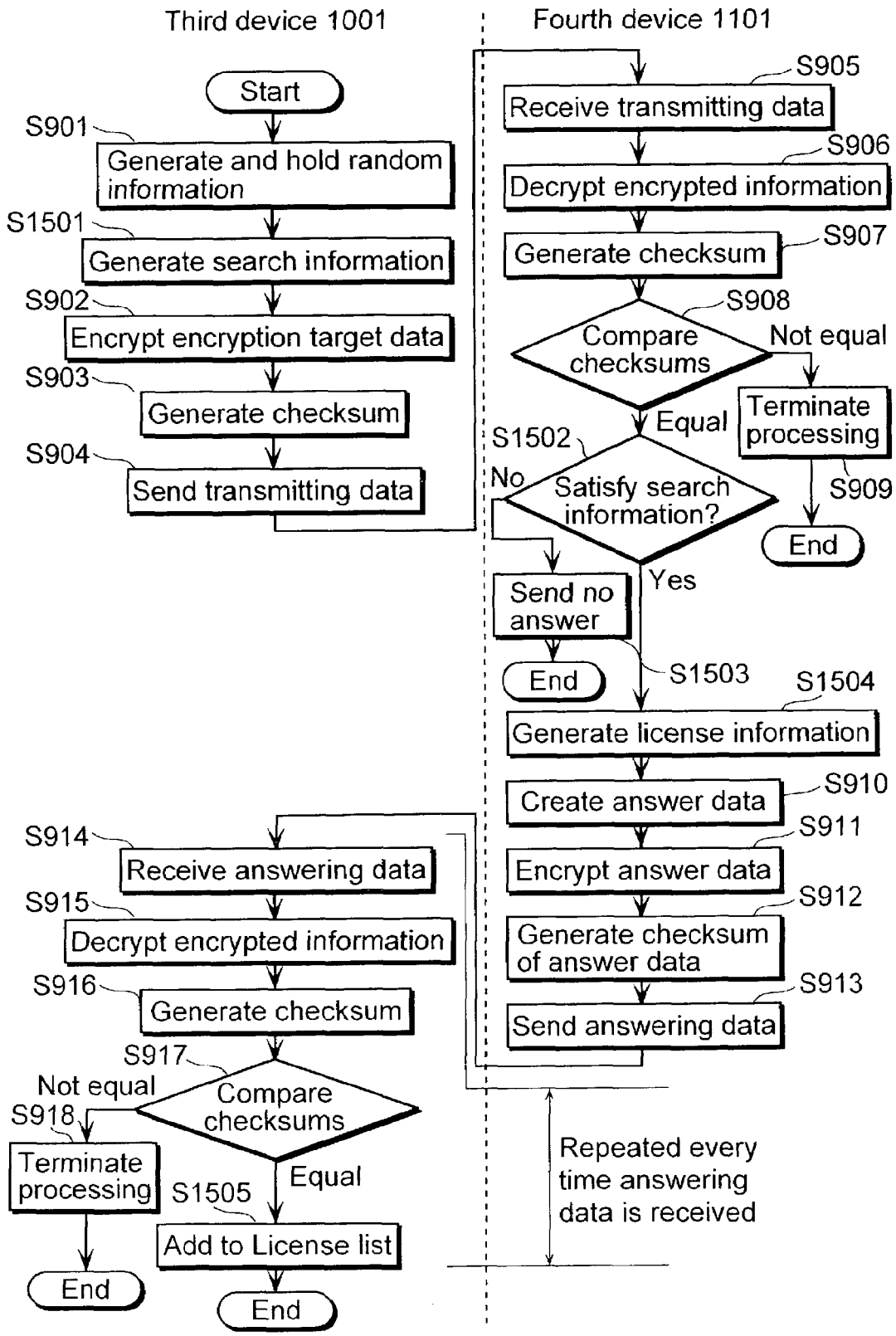
FIG. 15 is a flowchart showing a group determination processing of a device authentication system according to the second embodiment.

FIG. 15 is a flowchart showing the procedure of a group determination in the device authentication system according to the second embodiment. The group determination procedure of the device authentication system according to the first embodiment has been explained using FIG. 9, and for processes that are similar to the first embodiment, the same step numbers as those in FIG. 9 are used in FIG. 15 as well. A detailed flow of the third device 1001 creating a license list 1408 of devices that belong to the same group as itself and also satisfies the search information C is explained in accordance with FIG. 15.

First, the random information generating unit 301 included in the third device 1001 generates random information R2 (S901), and the search information attaching unit 1007 generates search information C that includes the content ID 1201 and the action ID 1202 of contents subject to searching (S1501). Then, the random information R2 and the search information C are sent to the encryption/decryption unit 302 and the checksum generating unit 304.

When the encryption/decryption unit 302 receives the random information R2 from the random information generating unit 301, the encryption/decryption unit 302 sends a common information acquisition request to the common information memory unit 303 and receives common information A from the common information memory unit 303. Then, the encryption/decryption unit 302 encrypts the encryption target data ED that at least includes the random information R2 and the search information C by using the common information A as a key, generates encrypted information E3 and sends the generated encrypted information E3 to the inter-device communication unit 305 (S902).

Next, the checksum generating unit 304 generates checksum CS5 of the encryption target data ED that at least includes the random information R2 and search information C, and sends the checksum CS5 to the inter-device communication unit 305 (S903).

When the inter-device communication unit 305 receives both the encrypted information E3 and checksum CS5, the inter-device communication unit 305 sends transmitting data T-Data 3, which at least includes the encrypted information E3 and checksum CS5 and is also attached with a message header etc. that complies with communication protocol, to other devices (S904).

Now, when the inter-device communication unit 405 that is included in the fourth device 1101 receives the transmitting data T-Data 3 from the third device 1001, the inter-device communication unit 405 extracts the aforementioned encrypted information E3 and checksum CS5 from the transmitting data T-Data 3 (S905). Then, the inter-device communication unit 405 sends the encrypted information E3 to the encryption/decryption unit 402 and the checksum CS5 to the checksum determination unit 406.

After the encryption/decryption unit 402 receives the encrypted information E3, the encryption/decryption unit 402 receives the common information A from the common information memory unit 403. Using this common information A as a key, the encryption/decryption unit 402 decrypts the encrypted information E3, obtains decrypted encryption target data DR2, and sends the decrypted encryption target data DR2 to the checksum generating unit 404 (S906). Next, the checksum generating unit 404 generates checksum CS6 of the decrypted encryption target data DR2 that was received and sends the checksum CS5 to the checksum determination unit 406 (S907). Then, the checksum determination unit 406 carries out comparison processing of the received checksums CS5 and CS6 (S908).

As a result of the comparison, the checksum determination unit 406 sends a control code that indicates the checksums are equal if CS5=CS6, and sends a control code that indicates the checksums are not equal if CS5≠CS6, in both cases to the answer data generating unit 407. Then, if the answer data generating unit 407 receives the control code indicating that the checksums CS5 and CS6 were not equal, no answer data is generated (S909).

Now, the search information determination unit 1106 determines whether or not the device holds any license that can be used for the content ID which applies to the search information C of the transmitting data T-Data 3 sent from the third device 1001, and if there is any relevant license held, then the device sends back answering data A-Data 4 attached with license information C2 (S1502). Meanwhile, in case the search information C is not satisfied, then the explanation will be given in this second embodiment under the assumption that no response is sent back (S1503). It is also possible, however, to describe data in the answering data A-Data 4 indicating that no data that corresponds to search information C was found.

Next, the search information determination unit 1106 generates the license information C2 that includes a license ID etc. (S11504), and when the answer data generating unit 407 receives a control code, the answer data generating unit 407 generates answer data AD that includes the license information C2 according to the control code, and sends the generated answer data AD to the encryption/decryption unit 402 and the checksum generating unit 404 (S910).

The encryption/decryption unit 402, then, extracts random information R2 from the decrypted encryption target data DR2 that it has been maintaining, and by using this random information R2 as a key, encrypts the received license information C2 and answer data AD, generates encrypted information E4, and sends the generated encrypted information E4 to the inter-device communication unit 405 (S911). Meanwhile, the checksum generating unit 404 generates checksum CS7 of the received answer data AD and sends the checksum Cs7 to the inter-device communication unit 405 (S912). Then, the inter-device communication unit 405 sends back answering data A-Data 4, which at least includes the encrypted information E4 and the checksum CS7 and attached with a message header etc. that complies with the communication protocol, to the third device 1001 (S913).

Now, the inter-device communication unit 305 that is included in the third device 1001 receives the answering data A-Data 4 from the fourth device 1101 and extracts the encrypted information E4 and checksum CS7 (S914). Then, the inter-device communication unit 305 sends the encrypted information E4 to the encryption/decryption unit 302 and the checksum CS7 to the checksum determination unit 306.

When the encryption/decryption unit 302 receives the encrypted information E4 from the inter-device communication unit 305, the encryption/decryption unit 302 receives random information R2 from the random information generating unit 301. The encryption/decryption unit 302 then decrypts the received encrypted information E4 by using the random information R2 as a key, obtains decrypted encrypted information (hereinafter referred to as "decrypted answer data") DA4 and sends the decrypted answer data DA4 to the checksum generating unit 304 and the checksum determination unit 306 (S915). The checksum generating unit 304 generates checksum CS8 of the received decrypted answer data DA4 and sends the checksum CS8 to the checksum determination unit 306 (S916). Then, the checksum determination unit 306 carries out a comparison processing of the received checksums CS7 and CS8 (S917).

If the result of the comparison is that CS7=CS8, then the checksum determination unit 306 determines that the fourth device 1101, which sent the answer data AD, belongs to the same group, and also that the device has a license that corresponds to the contents subject to searching, and therefore adds the license that is held by the fourth device 1101 and subject to searching to the license list 1408 (S1505). In the case where CS7≠CS8, then it is determined that the sending device either does not belong to the same group or does not satisfy search information C (S918). In this second embodiment, it is explained that encryption target sections of transmitting data T-Data 3 and answering data A-Data 4 are, respectively, encryption target data ED and answer data AD. It is also possible, however, to include the checksum 505 and checksum 605 in the encrypted section.

As has been explained, in the device authentication system according to the second embodiment, transmitting data T-Data 3 sent by the third device 1001 includes, in addition to random information 503, the content ID 1201 and action ID 1202 that are search information C. The fourth device 1101 decrypts the encrypted encryption target data ED by using the common information A, and determines whether or not the third device 1001 belongs to the same group by comparing the checksum 505. Furthermore, if the third device 1001 is determined to belong to the same group, a determination is made at the search information determination unit 1106 also whether or not the device holds a license that corresponds to the contents that are subject to the searching of the content ID 1201 and action ID 1202. If, as a result of the determination, the device holds a license that satisfies the search information C, then the answering data. A-Data 4 that includes information such as the license ID 1301 and usage rule data 1302 is sent back to the third device 1001.

When the third device 1001 receives the answering data A-Data 4, the third device 1001 decrypts the answer data AD by using random information 503, and by carrying out a comparison processing of the checksum 605, the third device 1001 determines that the fourth device 1101 belongs to the same group and also holds a license that satisfies the search information C, and thus creates the license list 1408 that satisfies the search information C.

Therefore, in addition to the positive effects described in the first embodiment, the device authentication system in this second embodiment does not make all the devices that have received the transmitting data T-Data 3 from the third device 1001 via broadcast send back the answering data A-Data 4, but makes only the devices that belong to the same group and also hold a license that satisfies the search information C send back the answering data A-Data 4. In this way, the third device 1001 creates the license list 1408, which is a list of devices that hold a license subject to searching, and by following the license list 1408, the third device 1001 can determine more efficiently the devices that can, for example, exchange or purchase a license. The present invention, therefore, can be applied to a license search among devices in a content distribution system.

In each of the above-mentioned embodiments, common information A was used to explain the common information. It is also possible, however, to make each device hold a plurality of common information, and by, for example, adding or deleting the plural common information, it will be possible to set the range of a group flexibly and easily.

As is apparent from the above explanations, the device authentication system according to the present invention comprises at least a first device and a second device for determining whether or not the first device and the second device belong to a same group. The first device includes: a first common information memory unit operable to memorize common information; a transmitting data by generating unit operable to generate transmitting data that includes key information; a first encryption unit operable to encrypt the generated transmitting data using the common information; a first transmission unit operable to send the encrypted transmitting data generated by the first encryption unit to the second device; a first decryption unit operable to decrypt, by using the key information, encrypted answering data sent from the second device; and an authentication unit operable to judge whether or not the decrypted answering data is determined to have a predetermined rule, and when the decrypted answering data has a predetermined rule, to determine that the first device and the second device belong to a same group. The second device includes: a second common information memory unit operable to memorize the common information; a second decryption unit operable to decrypt, by using the common information, the encrypted transmitting data sent from the first device; a judging unit operable to judge whether or not the decrypted transmitting data is determined to have a predetermined rule; an answering data generating unit operable to determine that, when the transmitting data has a predetermined rule, the first device and the second device belong to a same group, and to generate answering data indicating that the first device and the second device belong to a same group; a second encryption unit operable to encrypt the generated answering data by using the key information included in the transmitting data decrypted by the second decryption unit; and a second transmission unit operable to send the encrypted answering data generated by the second encryption unit to the first device.

In this way, the device authentication system according to the present invention enables a terminal to determine other terminals that belong to a same group when terminals are in equal relationships with each other, and also enables a terminal to obtain a list of devices that belong to a same group in a secure manner, before it carries out processing such as authentication or content transmission that gives a heavy load to the terminal. Furthermore, by using the aforementioned group list, the device authentication system enables a terminal to determine to which device it will send transmitting data, and realizes an efficient utilization of communication channel etc. by not communicating with terminals that are not allowed to obtain certain content.

Also, in the device authentication system according to the present invention, the transmitting data generating unit generates the transmitting data to include search information that specifies a target of searching, the second device further includes a search information judging unit operable to judge whether or not the second device holds a target indicated by the search information that is included in the decrypted transmitting data, and the answering data generating unit generates the answering data to include a result of the judgment made by the search information judging unit. Furthermore, the transmitting data generating unit makes a content ID that specifies digital content to be included in the transmitting data as the search information, and the answering data generating unit makes a license ID that specifies a license to be included in the answering data, when the second device holds the license, which is right information that allows utilization of the digital content indicated by the content ID that is included in the transmitting data.

In this way, the device authentication system according to the present invention enables a terminal to create a license list, a list of devices that hold a license subject to searching, and by following the license list, the system enables a terminal to determine more efficiently the devices that can, for example, exchange or purchase a license, and thus enables the system to be applied to a license search among devices in a content distribution system.

INDUSTRIAL APPLICABILITY

The device authentication system according to the present invention can be applicable to a content distribution system that distributes content from a server to a terminal via network, using a personal computer with communication facility.

The invention claimed is:

1. A device authentication system comprising a plurality of devices which each belong to a group, said device authentication system for determining whether or not a first device and a second device included in said plurality of devices belong to a same group, wherein said first device includes:
 a first common information memory unit configured to memorize first common information which is shared in a group to which said first device belongs and which is different from common information shared in another group;
 a transmitting data generating unit configured to generate transmitting data that includes key information;
 a first encryption unit configured to encrypt the transmitting data by using the first common information memorized by said first common information memory unit;
 a first checksum generating unit configured to generate a first checksum of the transmitting data generated by said transmitting data generating unit;
 a first transmission unit configured to send the transmitting data encrypted by said first encryption unit together with the first checksum of the transmitting data to said second device;
 a first decryption unit configured to decrypt, by using the key information included in the transmitting data, encrypted answering data sent from said second device; and
 an authentication unit configured to judge whether or not the decrypted answering data has a predetermined rule, and to determine, when the decrypted answering data has a predetermined rule, that said first device and said second device belong to a same group; and wherein said second device includes:
 a second common information memory unit configured to memorize second common information which is shared in a group to which said second device belongs and which is different from common information shared in another group;
 a second decryption unit configured to decrypt, by using the second common information memorized by said second common information memory unit, the encrypted transmitting data sent from said first device;
 a second checksum generating unit configured to generate a second checksum of the decrypted transmitting data;
 a judging unit configured to judge whether or not the decrypted transmitting data has a predetermined rule by judging whether or not the second checksum of the decrypted transmitting data is equal to the first checksum of the transmitting data sent from said first transmission unit of said first device;
 an answering data generating unit configured to determine, when said judging unit judges that the decrypted transmitting data has the predetermined rule, that said first device and said second device belong to a same group, and to generate answering data indicating that said first device and said second device belong to a same group;
 a second encryption unit configured to encrypt the answering data by using key information included in the transmitting data decrypted by said second decryption unit; and a second transmission unit configured to send the encrypted answering data encrypted by said second encryption unit to said first device.

2. The device authentication system according to claim 1, wherein said transmitting data generating unit is configured to generate a random number, and generate transmitting data that includes the generated random number as the key information.

3. The device authentication system according to claim 1, wherein said second device is configured to not send the answering data to said first device when said judging unit judges that the decrypted transmitting data does not have the predetermined rule.

4. The device authentication system according to claim 1, wherein:
said first encryption unit is configured to combine and encrypt the transmitting data and the first checksum;
said first transmission unit is configured to send the encrypted data generated by said first encryption unit to said second device;
said second decryption unit is configured to decrypt, by using the common information memorized by said second common information memory unit, the encrypted data sent from said first device into the transmitting data and the first checksum; and
said judging unit is configured to judge whether or not the transmitting data has the predetermined rule by judging whether or not the second checksum of the decrypted transmitting data is equal to the decrypted first checksum.

5. The device authentication system according to claim 1, wherein:
said transmitting data generating unit is configured to generate transmitting data that includes pre-decided fixed information; and
said judging unit is configured to judge whether or not the transmitting data has the predetermined rule by judging whether or not fixed information included in the decrypted transmitting data has a pre-decided data pattern.

6. The device authentication system according to claim 1 comprising a plurality of said second devices,
wherein said first transmission unit is configured to broadcast the transmitting data to a plurality of said second devices.

7. The device authentication system according to claim 1 comprising a plurality of said second devices,
wherein said first transmission unit is configured to send the transmitting data to a plurality of said second devices; and
wherein said first device further includes:
a group list generating unit configured to generate a group list indicating a list of at least one of said second devices that belongs to a same group as said first device based on a determination made on a plurality of said second devices by said authentication unit; and
a group communication unit configured to perform a predetermined communication with said at least one of said second devices according to the group list generated by said group list generating unit.

8. The device authentication system according to claim 7, wherein said first device is configured to control at least one of said transmitting data generating unit, said first transmission unit and said group list generating unit, so that a number of said at least one of said second devices registered in the group list does not exceed a predetermined number.

9. The device authentication system according to claim 1, wherein:
said transmitting data generating unit is configured to generate padding data to be included in the transmitting data so that a size of the transmitting data is of a predetermined length; and
said answering data generating unit is configured to generate padding data to be included in the answering data so that a size of the answering data is of a predetermined length.

10. The device authentication system according to claim 1, wherein:
said transmitting data generating unit is configured to generate the transmitting data to include search information that specifies a target of searching;
said second device further includes a search information judging unit configured to judge whether or not the second device holds a target indicated by the search information that is included in the decrypted transmitting data; and
said answering data generating unit is configured to generate the answering data to include a result of a judgment made by said search information judging unit.

11. The device authentication system according to claim 10, wherein:
said transmitting data generating unit is configured to generate a content ID that specifies digital content to be included in the transmitting data as the search information; and
said answering data generating unit is configured to generate a license ID that specifies a license to be included in the answering data, when said second device holds the license, which is rights information that allows utilization of the digital content indicated by the content ID that is included in the transmitting data.

12. The device authentication system according to claim 11, wherein said first device further includes:
a license list generating unit configured to generate a license list indicating a list of the license ID that is included in the answering data sent from said second device; and
a license transmission unit configured to perform communication for sending and receiving a license with said second device based on the license list generated by said license list generating unit.

13. The device authentication system according to claim 1, wherein:
said first common information memory unit is configured to memorize a plurality of common information including the first common information;
said second common information memory unit is configured to memorize a plurality of common information including the second common information;
said first encryption unit is configured to encrypt the transmitting data by using the first common information selected from among a plurality of the common information memorized in said first common information memory unit; and
said second decryption unit is configured to decrypt the transmitting data by using the second common information selected from among a plurality of the common information memorized in said second common information memory unit.

14. The device authentication system according to claim 13, wherein:

said transmitting data generating unit is configured to generate the transmitting data to include search information that specifies digital content and a form of usage of the content;

said second device further includes a search information judging unit configured to judge whether or not said second device holds a license, which is rights information that allows utilization of the digital content in the form of usage, indicated by the search information included in the decrypted transmitting data;

said answering data generating unit is configured to generate the answering data to include a result of a judgment made by said search information judging unit;

said first encryption unit is configured to select, as the first common information, a single common information that corresponds to the form of usage from among a plurality of the common information memorized in said first common information memory unit, and encrypt the transmitting data by using the selected common information; and said second decryption unit is configured to select, as the second common information, a single common information that corresponds to the form of usage from among a plurality of the common information memorized in said second common information memory unit, and decrypt the transmitting data by using the selected common information.

15. The device authentication system according to claim 14, wherein:

said first device further includes a first common information editing unit configured to perform adding and deleting of the common information memorized in said first common information memory unit; and said second device further includes a second common information editing unit configured to perform adding and deleting of the common information memorized in said second common information memory unit.

16. A device authentication method for a system comprising a plurality of devices which each belong to a group, said method being for determining whether or not a first device and a second device included in the plurality of devices belong to a same group, wherein:

the first device includes a first common information memory unit, and the second device includes a second common information memory unit, the first common information memory unit being configured to memorize first common information which is shared in a group to which the first device belongs and which is not shared in another group, and the second common information memory unit being configured to memorize second common information which is shared in a group to which the second device belongs and which is different from common information shared in another group;

said device authentication method includes a first operation performed by the first device and a second operation performed by the second device;

said first operation includes:

generating transmitting data that includes key information;

encrypting the transmitting data by using the first common information memorized in the first common information memory unit;

generating a first checksum of the transmitting data generated in said generating of the transmitting data;

sending the encrypted transmitting data together with the first checksum of the transmitting data to the second device;

decrypting, by using the key information included in the transmitting data, encrypted answering data sent from the second device; and judging whether or not the answering data decrypted in said decrypting of the encrypted answering data has a predetermined rule, and determining, when the decrypted answering data has a predetermined rule, that the first device and the second device belong to a same group; and said second operation includes:

decrypting, by using the second common information memorized in the second common information memory unit, the encrypted transmitting data sent from the first device in said sending of the encrypted transmitting data;

generating a second checksum of the decrypted transmitting data;

judging whether or not the decrypted transmitting data has a predetermined rule by judging whether or not the second checksum of the decrypted transmitting data is equal to the first checksum of the transmitting data sent from the first device;

determining, when the decrypted transmitting data is judged to have the predetermined rule, that the first device and the second device belong to a same group, and generating answering data indicating that the first device and the second device belong to a same group;

encrypting the generated answering data by using key information that is included in the transmitting data decrypted in said decrypting of the encrypted transmitting data; and sending the encrypted answering data to the first device.

17. The device authentication method according to claim 16, wherein said generating of the transmitting data comprises generating a random number and generating transmitting data that includes the generated random number as the key information.

18. The device authentication method according to claim 16, wherein:

said encrypting of the generated transmitted data comprises combining and encrypting the transmitting data and the first checksum;

said sending of the encrypted transmitting data comprises sending the encrypted data generated in said encrypting of the generated transmitted data to the second device;

said decrypting of the encrypted transmitting data comprises decrypting the encrypted data sent from the first device into transmitting data and the first checksum, by using the common information memorized in the second common information memory unit; and said judging whether or not the decrypted transmitting data has the predetermined rule comprises judging whether or not the second checksum of the decrypted transmitting data is equal to the first checksum that is decrypted.

19. The device authentication method according to claim 16, wherein:

the system includes a plurality of the second devices;

said sending of the encrypted transmitting data comprises sending the transmitting data to a plurality of the second devices; and said first operation further includes:
   generating a group list that indicates a list of at least one of the second devices that belongs to a same group as the first device, based on a determination made on a plurality of the second devices in said judging whether or not the decrypted answering data has a predetermined rule; and
   performing a predetermined communication with the second device according to the group list generated in said generating of the group list.

20. The device authentication method according to claim 16, wherein:
   said generating of the transmitting data comprises generating the transmitting data to include search information that specifies a target of searching;
   said second operation further includes judging whether or not the second device holds a target indicated by the search information that is included in the transmitting data decrypted in said decrypting of the encrypted transmitting data sent from the first device; and
   said generating of the answering data comprises generating answering data including a result of the judgment made in said judging whether or not the second device holds the target indicated by the search information.

21. The device authentication method according to claim 20, wherein:
   said generating of the transmitting data comprises generating transmitting data which includes a content ID that specifies digital content as the search information, and
   said generating of the answering data comprises generating answering data which includes a license ID that specifies the license, when the second device holds the license, which is rights information that allows utilization of the digital content indicated by the content ID included in the transmitting data.

22. The device authentication method according to claim 16, wherein:
   the first common information memory unit is configured to memorize a plurality of common information including the first common information, and the second common information memory unit is configured to memorize a plurality of common information including the second common information;
   said encrypting of the generated transmitting data comprises encrypting the transmitting data by using the first common information selected from among a plurality of the common information memorized in the first common information memory unit; and
   said decrypting of the encrypted transmitting data comprises decrypting the transmitting data by using the second common information selected from among a plurality of the common information memorized in the second common information memory unit.

23. A communication device for determining whether or not a partner device and said communication device belong to a same group by mutually authenticating with the partner device, said communication device comprising:
   an authentication unit configured to authenticate a partner device; and
   an authentication target unit configured to be authenticated by the partner device, and
   wherein said authentication unit includes:
      a common information memory unit configured to memorize first common information which is shared in a group to which said communication device belongs and which is different from common information shared in an other group;
      a transmitting data generating unit configured to generate first transmitting data that includes key information;
      a first encryption unit configured to encrypt the first transmitting data by using the first common information memorized in said common information memory unit;
      a first transmission unit configured to send the encrypted first transmitting data to the partner device;
      a first decryption unit configured to decrypt, by using the key information included in the first transmitting data, encrypted first answering data sent from the partner device; and
      an authentication unit configured to judge whether or not the decrypted first answering data has a predetermined rule, and to determine, when the decrypted first answering data has a predetermined rule, that the partner device and said communication device belong to a same group;
   wherein the partner device includes a second common information memory unit configured to memorize second common information which is shared in a group to which the partner device belongs and which is different from common information shared in another group, and a first checksum generating unit configured to generate a first checksum of second transmitting data;
   wherein the partner device is configured to encrypt the second transmitting data by using the second common information memorized in the second common information memory unit, and send the first checksum of the second transmitting data together with the encrypted second transmitting data to said communication device; and
   wherein said authentication target unit includes:
      a second decryption unit configured to decrypt, by using the first common information, the encrypted second transmitting data sent from the partner device;
      a second checksum generating unit configured to generate a second checksum of the decrypted second transmitting data;
      a judging unit configured to judge whether or not the decrypted second transmitting data has a predetermined rule by judging whether or not the second checksum of the decrypted second transmitting data is equal to the first checksum of the second transmitting data sent from the partner device;
      an answering data generating unit configured to determine that, when said judging unit judges that the decrypted second transmitting data has the predetermined rule, the partner device belongs to a same group as said communication device, and to generate second answering data that indicates that the partner device belongs to a same group as said communication device;
      a second encryption unit configured to encrypt the second answering data by using key information that is included in the second transmitting data decrypted by said second decryption unit; and
      a second transmission unit configured to send the second answering data encrypted by said second encryption unit to the partner device.

24. The communication device according to claim 23, wherein said transmitting data generating unit is configured to generate a random number, and generate first transmitting data that includes the generated random number as the key information.

25. The communication device according to claim 23, wherein said first transmission unit is configured to send a checksum of the first transmitting data, together with the encrypted first transmitting data, to the partner device.

26. A program recorded on a computer-readable medium and executed by a communication device that determines whether or not a partner device and the communication device belong to a same group by mutually authenticating with the partner device, said program causing the communication device to perform operations comprising:

an authentication operation for authenticating a partner device; and an authentication target operation for being authenticated by the partner device, wherein said authentication operation includes:

generating first transmitting data that includes key information;

encrypting the first transmitting data generated in said generating of the first transmitting data by using common information that is memorized beforehand;

sending the first transmitting data encrypted in said encrypting of the generated first transmitting data to the partner device;

decrypting, by using the key information included in the first transmitting data generated in said generating of the first transmitting data, encrypted first answering data sent from the partner device; and judging whether or not the first answering data decrypted in said decrypting of the encrypted first answering data has a predetermined rule, and determining, when the decrypted first answering data is judged to have a predetermined rule, that the partner device belongs to a same group as the communication device; and wherein said authentication target operation includes:

receiving a first checksum of second transmitting data generated by the partner device, together with encrypted second transmitting data from the partner device;

decrypting, by using the common information, the encrypted second transmitting data sent from the partner device;

generating a second checksum of the second transmitting data decrypted in said decrypting of the encrypted second transmitting data;

judging whether or not the second transmitting data decrypted in said decrypting of the encrypted second transmitting data has a predetermined rule by judging whether or not the second checksum of the decrypted second transmitting data is equal to the first checksum of the second transmitting data sent from the partner device;

determining, when the second transmitting data is judged to have the predetermined rule in said judging whether or not the decrypted second transmitting data has the predetermined rule because the first and second checksums are equal to each other, that the partner device and the communication device belong to a same group, and generating second answering data indicating that the partner device and the communication device belong to a same group;

encrypting the second answering data generated in said generating of the second answering data by using key information that is included in the second transmitting data decrypted in said decrypting of the encrypted second transmitting data; and sending the second answering data encrypted in said encrypting of the generated second answering data to the partner device.

27. The program according to claim 26, wherein said generating of the first transmitting data comprises generating a random number, and then generating first transmitting data that includes the generated random number as the key information.

28. The program according to claim 26, wherein said sending of the encrypted first transmitting data comprises sending a checksum of the first transmitting data together with the encrypted first transmitting data to the partner device.

29. A computer-readable recording medium for a device authentication system comprising a first device and a second device for determining whether or not the first device and the second device belong to a same group, wherein:

said computer-readable medium has authentication data recorded thereon, the authentication data including encrypted transmitting data that includes key information and is encrypted by using common information, and a first checksum of the transmitting data;

the authentication data is data sent from the first device to the second device;

the key information is used for encrypting answering data sent from the second device to the first device, when the second device determines that the first device belongs to a same group as the second device, the second device determining that the first device belongs to the same group as the second group by decrypting the encrypted transmitting data included in the authentication data sent from the first device, generating a second checksum of the decrypted transmitting data, judging whether or not the second checksum of the decrypted transmitting data is equal to the first checksum of the transmitting data included in the authentication data sent from the first device, and determining that the first device belongs to the same group as the second device when the first and second checksums are equal to each other; and the common information is information held beforehand by a device that belongs to the same group.

30. The recording medium according to claim 29, wherein the key information is a random number generated by the first device.

31. The recording medium according to claim 29, wherein the transmitting data includes a content ID that specifies a digital content, and the answering data includes a license ID that specifies a license, which is rights information that allows utilization of the digital content indicated by the content ID that is included in the transmitting data.

* * * * *

UNITED STATES PATENT AND TRADEMARK OFFICE
CERTIFICATE OF CORRECTION

| | |
|---|---|
| PATENT NO. | : 7,260,720 B2 |
| APPLICATION NO. | : 10/271563 |
| DATED | : August 21, 2007 |
| INVENTOR(S) | : Masaya Yamamoto et al. |

It is certified that error appears in the above-identified patent and that said Letters Patent is hereby corrected as shown below:

Column 31, line 8 through Column 32, line 10,

Should read:

-- 26. A program recorded on a computer-readable medium and executed by a communication device that determines whether or not a partner device and the communication device belong to a same group by mutually authenticating with the partner device, wherein the communication device possesses first common information that is memorized therein beforehand, the first common information being shared in a group to which the communication device belongs and which is different from common information shared in another group;

wherein the partner device possesses second common information that is memorized therein beforehand, the second common information being shared in a group to which the partner device belongs and which is different from common information shared in another group;

wherein said program causes the communication device to perform operations comprising:

an authentication operation for authenticating a partner device; and an authentication target operation for being authenticated by the partner device, wherein said authentication operation includes:

generating first transmitting data that includes key information;

encrypting the first transmitting data by using the first common information memorized in the communication device beforehand;

sending the encrypted first transmitting data to the partner device;

decrypting, by using the key information included in the first transmitting data, encrypted first answering data sent from the partner device; and

UNITED STATES PATENT AND TRADEMARK OFFICE
CERTIFICATE OF CORRECTION

| | |
|---|---|
| PATENT NO. | : 7,260,720 B2 |
| APPLICATION NO. | : 10/271563 |
| DATED | : August 21, 2007 |
| INVENTOR(S) | : Masaya Yamamoto et al. |

It is certified that error appears in the above-identified patent and that said Letters Patent is hereby corrected as shown below:

judging whether or not the decrypted first answering data has a predetermined rule, and determining, when the decrypted first answering data is judged to have a predetermined rule, that the partner device belongs to a same group as the communication device; and wherein said authentication target operation includes:

receiving a first checksum of second transmitting data generated by the partner device, together with encrypted second transmitting data from the partner device, the partner device having encrypted the second transmitting data by using the second common information memorized in the partner device beforehand;

decrypting, by using the first common information, the encrypted second transmitting data sent from the partner device;

generating a second checksum of the decrypted second transmitting data;

judging whether or not the decrypted second transmitting data has a predetermined rule by judging whether or not the second checksum of the decrypted second transmitting data is equal to the first checksum of the second transmitting data sent from the partner device;

determining, when the decrypted second transmitting data is judged to have the predetermined rule, that the partner device and the communication device belong to a same group, and generating second answering data indicating that the partner device and the communication device belong to a same group;

encrypting the second answering data by using key information that is included in the decrypted second transmitting data; and sending the encrypted second answering data to the partner device. --

UNITED STATES PATENT AND TRADEMARK OFFICE
CERTIFICATE OF CORRECTION

| | |
|---|---|
| PATENT NO. | : 7,260,720 B2 |
| APPLICATION NO. | : 10/271563 |
| DATED | : August 21, 2007 |
| INVENTOR(S) | : Masaya Yamamoto et al. |

It is certified that error appears in the above-identified patent and that said Letters Patent is hereby corrected as shown below:

Column 32,

Lines 21-50 should read:

-- 29. A computer-readable recording medium for a device authentication system comprising a first device and a second device for determining whether or not the first device and the second device belong to a same group, wherein:

the first device possesses first common information that is memorized therein beforehand, the first common information being shared in a group to which the first device belongs and which is different from common information shared in another group;

the second device possesses second common information that is memorized therein beforehand, the second common information being shared in a group to which the partner device belongs and which is different from common information shared in another group;

said computer-readable medium has authentication data recorded thereon, the authentication data including encrypted transmitting data that includes key information and is encrypted by using the first common information memorized in the first device beforehand, and a first checksum of the transmitting data;

the authentication data is data sent from the first device to the second device;

the key information is used for encrypting answering data sent from the second device to the first device, when the second device determines that the first device belongs to a same group as the second device, the second device determining that the first device belongs to the same group as the second group by decrypting the encrypted transmitting data, by using the second common information memorized in the second

UNITED STATES PATENT AND TRADEMARK OFFICE
CERTIFICATE OF CORRECTION

PATENT NO.         : 7,260,720 B2
APPLICATION NO. : 10/271563
DATED              : August 21, 2007
INVENTOR(S)        : Masaya Yamamoto et al.

It is certified that error appears in the above-identified patent and that said Letters Patent is hereby corrected as shown below:

device beforehand, included in the authentication data sent from the first device, generating a second checksum of the decrypted transmitting data, judging whether or not the second checksum of the decrypted transmitting data is equal to the first checksum of the transmitting data included in the authentication data sent from the first device, and determining that the first device belongs to the same group as the second device when the first and second checksums are equal to each other. --

Signed and Sealed this

Twenty-fourth Day of June, 2008

JON W. DUDAS
*Director of the United States Patent and Trademark Office*